United States Patent
Shiozawa et al.

(10) Patent No.: US 7,454,405 B2
(45) Date of Patent: Nov. 18, 2008

(54) FILE MANAGEMENT PROGRAM, FILE MANAGEMENT PROCESS, AND FILE MANAGEMENT APPARATUS

(75) Inventors: Kensuke Shiozawa, Kawasaki (JP); Takeshi Miyamae, Kawasaki (JP); Yoshitake Shinkai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 304 days.

(21) Appl. No.: 11/036,678

(22) Filed: Jan. 14, 2005

(65) Prior Publication Data

US 2005/0283489 A1    Dec. 22, 2005

(30) Foreign Application Priority Data

Aug. 17, 2004    (JP)    ............................ 2004-237550

(51) Int. Cl.
   *G06F 12/00*    (2006.01)
(52) U.S. Cl. .............................................. 707/2; 707/1
(58) Field of Classification Search ...................... 707/2, 707/1; 714/42; 712/1
   See application file for complete search history.

(56) References Cited

U.S. PATENT DOCUMENTS

| | | | | |
|---|---|---|---|---|
| 5,202,982 | A | * | 4/1993 | Gramlich et al. ................ 707/2 |
| 6,308,320 | B1 | * | 10/2001 | Burch ......................... 717/154 |
| 2003/0070090 | A1 | * | 4/2003 | Hillhouse .................... 713/201 |
| 2003/0093647 | A1 | * | 5/2003 | Mogi et al. ..................... 712/1 |
| 2004/0059866 | A1 | * | 3/2004 | Patel et al. .................. 711/100 |
| 2004/0073846 | A1 | * | 4/2004 | Nakanishi et al. ............. 714/42 |

FOREIGN PATENT DOCUMENTS

| | | |
|---|---|---|
| JP | 59-095648 | 6/1984 |
| JP | 5-040680 | 2/1993 |
| JP | 2000357115 A * | 12/2000 |

OTHER PUBLICATIONS

Usenix Association, Proceedings of the 5th Annual Linux SHowcase & Conference (Nov. 2001).*
Proceedings of the 5th Annual Linux Showcase & conference (Usenix Association), Nov. 2001.*

(Continued)

*Primary Examiner*—Hung T Vy
*Assistant Examiner*—Angela M Lie
(74) *Attorney, Agent, or Firm*—Greer, Burns & Crain, Ltd.

(57) ABSTRACT

A file management program which enables efficient access to data in a directory file by utilizing an extent-based data access structure. When a processing request containing the name information for a file to be processed is inputted, a hash-value generation unit applies a predetermined hash function to the name information, and generates a hash value of the file to be processed. Next, a physical-block-number acquisition unit looks up a hash-value-range table, extracts hash-value-range information, and acquires a physical-block number from the hash-value-range information, where a hash-value range containing the hash value of the file to be processed is included in the hash-value-range information. Then, a directory processing unit acquires from a physical block in a storage device data corresponding to the acquired physical-block number, and performs processing of the data according to the processing request.

8 Claims, 16 Drawing Sheets

OTHER PUBLICATIONS

I. Dowse et al.; "Recent Filesystem Optimisations in FeeBSD"; Proceedings of the Freenix Track; 2002 Usenix Annual Technical Conference; Jun. 2002.

A. Sweeney et al; "Scalability in the XFS File System" Proceedings of the Usenix 1996 Annual Technical Conference; Jan. 1996.

F. Schmuck et al.; "GPFS: A Shared-Disk File System for Large Computing Clusters"; Proceedings of the First Conference on File and Storage Technologies; pp. 1-15; Jan. 2002.

D. Phillips; "A Directory Index for Ext2"; Proceedings of the Fifth Annual Linux Showcase and Conference, Nov. 2001.

* cited by examiner

422 EXTENT TABLE

| LOGICAL-BLOCK NUMBER | LENGTH | PHYSICAL-BLOCK NUMBER |
|---|---|---|
| 0 | 100 | 300 |
| 103 | 10 | 50 |
| ⋮ | ⋮ | ⋮ |

424 HASH-VALUE-RANGE TABLE

| STARTING VALUE OF HASH-VALUE RANGE | LENGTH | PHYSICAL-BLOCK NUMBER |
|---|---|---|
| 0 | 150 | 200 |
| 150 | 100 | 40 |
| ⋮ | ⋮ | ⋮ |

FILE MANAGEMENT PROGRAM, FILE MANAGEMENT PROCESS, AND FILE MANAGEMENT APPARATUS

CROSS-REFERENCE TO RELATED APPLICATIONS

This application is based upon and claims the benefits of priority from the prior Japanese Patent Application No. 2004-237550, filed on Aug. 17, 2004, the entire contents of which are incorporated herein by reference.

BACKGROUND OF THE INVENTION

1) Field of the Invention

The present invention relates to a file management program, a file management process, and a file management apparatus for management of files in a storage device, and in particular to a file management program, a file management process, and a file management apparatus which utilize an extent-based system.

2) Description of the Related Art

The extent-based file management is a technique for increasing the efficiency of a file system. According to the extent-based file management, contiguous logical regions (blocks) are treated as a unit called an extent on a volume, and a plurality of blocks can be accessed as an extent. Therefore, data stored in a plurality of blocks can be efficiently accessed.

In recent years, the extent-based file systems have been becoming mainstream. In many extent-based file systems, a directory file is formed by randomly arranging variable-length records representing directory records on a linear logical block region. That is, records in which names of files under a directory are registered are arranged irrespective of the names of the files. Therefore, the processing for searching for a name leads to a linear search of the entire target directory file.

In addition, in order to suppress occurrence of a linear search of an entire directory file, it is possible to use a name cache. The name cache is realized by caching in a memory directory records which have been looked up, and acquiring one of the cached directory records when access to a file having an identical name to a file which has been looked up is requested. However, since the capacity of the memory which can be mounted in the system is limited, it is impossible to manage all of the directory entries in the system by using the name cache. Therefore, a linear search of the entire target directory file occurs with an ignorable frequency.

In particular, in recent years, the amount of data managed by each file system has significantly increased, and many directories have a great number of files thereunder and are massive. When the size of a directory increases, the hit rate in the name cache decreases, and therefore the probability of occurrence of a search of the entire directory file increases. Thus, in some cases, the overall performance of the file system deteriorates.

It is known that use of the so-called directory index is effective for solving the above problem, where the directory index is an index containing name information and being arranged in a directory file. Conventionally, several techniques for realizing the directory index have been proposed. Four representative examples of such techniques are indicated below.

FIRST EXAMPLE

According to the first example of the conventional techniques, a table as the directory index (table) is arranged in a main memory. Specifically, an index called dirhash is produced at the time of the first search of a directory in order to speed up search operations after the first search. Although the time necessary for the first search is not reduced by this technique, this technique is advantageous that the existing directory file layout is not required to be changed. For example, this technique is disclosed by I. Dowse et al., "Recent Filesystem Optimisations in FreeBSD," the Proceedings of the USENIX 2002 Annual Technical Conference, Monterey, Calif., June 2002, Freenix Track-Paper, pp. 245-258.

SECOND EXAMPLE

According to the second example of the conventional techniques, a B+tree using hash values of names as keys is arranged for each directory file, and the directory entries are managed as records of the B+tree. For example, this technique is disclosed by A. Sweeney et al., "Scalability in the XFS File System," the Proceedings of the USENIX 1996 Annual Technical Conference, San Diego, Calif., January 1996, pp. 1-14.

THIRD EXAMPLE

According to the third example of the conventional techniques, a hash technique called extensible hashing is used, and a candidate for a logical-block number in a directory entry is determined by using a hash function of a name. The operation is started with only one block. When the block becomes full, the directory size is expanded to a power of two. When the blocks become full, the blocks are split, and the directory entry is directed toward an appropriate logical block according to the hash value. For example, this technique is disclosed by F. Schmuck et al., "GPFS: A Shared-Disk File System for Large Computing Clusters," the Proceedings of the First Conference on File and Storage Technologies, Monterey, Calif., January 2002, FAST 2002 Paper, pp. 231-244.

FOURTH EXAMPLE

According to the fourth example of the conventional techniques, a B+tree using hash values of names as keys is arranged on a linear space of the existing logical blocks, and a provision is made so that it is unnecessary to change the layout of the existing directory file. For example, this technique is disclosed by D. Phillips, "A Directory Index for Ext2," the Proceedings of the Fifth Annual Linux Showcase and Conference, Oakland, Calif., November 2001, ALS 2001 Paper, pp. 173-182.

However, the aforementioned conventional techniques have at least one of the following problems.

The first problem is that the limited capacity of the mountable memory restricts performance improvement. That is, since the capacity of the mountable memory is limited, it is basically difficult to concurrently arrange indexes (tables) of a great number of directories. For example, the aforementioned first technique disclosed in the Dowse reference has this problem. Therefore, it is better to arrange the directory index (table) outside the main memory.

The second problem is that extensive modification of the existing system is required. When the indexes (tables) for directory files are arranged separately from the other types of files, the magnitude of system development increases. For example, the aforementioned second technique disclosed in the Sweeney reference has this problem. Therefore, it is better to use the conventional control method and make efforts to reduce the magnitude of system development.

The third problem is that the performance deteriorates due to the use of the linear space of the existing logical blocks. When a set of name information items and an index (table) corresponding to the set are arranged on the linear space of the existing logical blocks, it is impossible to obtain actual block data without conversion from a logical block to a physical block. Therefore, the processing speed is unsatisfactory. For example, the aforementioned third and fourth techniques disclosed in the Schmuck reference and the Phillips reference have this problem. Therefore, it is better to directly obtain physical blocks based on the names, and make efforts to further improve the performance.

SUMMARY OF THE INVENTION

The object of the present invention is to provide a file management program, a file management process, and a file management apparatus which enables efficient access to data in a directory file by utilizing an extent-based data access structure.

In order to accomplish the above object, a file management program which makes a computer perform processing for management of files in a storage device is provided. The file management program comprises: a hash-value generation unit which receives a processing request containing name information for a file to be processed, applies a predetermined hash function to the name information, and generates a hash value of the file to be processed; a physical-block-number acquisition unit which looks up a hash-value-range table containing at least one hash-value-range information set each of which is constituted by a hash-value range defining a range of hash values and a physical-block number uniquely indicating a data storage region in the storage device, extracts one of the at least one hash-value-range information set in which a hash-value range containing the hash value of the file to be processed is included, and acquires a physical-block number from the one of the at least one hash-value-range information set; and a directory processing unit which performs processing of a physical block in the storage device corresponding to the physical-block number acquired by the physical-block-number acquisition unit, where the processing relates to a record containing the name information and is performed in accordance with the processing request.

In addition, in order to accomplish the aforementioned object, a file management process for managing files in a storage device by using a computer is provided. The file management process comprises the steps of: (a) receiving a processing request containing name information for a file to be processed, applying a predetermined hash function to the name information, and generating a hash value of the file to be processed, by a hash-value generation unit; (b) looking up a hash-value-range table containing at least one hash-value-range information set each of which is constituted by a hash-value range defining a range of hash values and a physical-block number uniquely indicating a data storage region in the storage device, extracting one of the at least one hash-value-range information set in which a hash-value range containing the hash value of the file to be processed is included, and acquiring a physical-block number from the one of the at least one hash-value-range information set, by a physical-block-number acquisition unit; and (c) performing, by a directory processing unit, processing of a physical block in the storage device corresponding to the physical-block number acquired by the physical-block-number acquisition unit, where the processing relates to a record containing the name information and is performed in accordance with the processing request.

Further, in order to accomplish the aforementioned object, a file management apparatus for managing files in a storage device is provided. The file management apparatus comprises: a hash-value generation unit which receives a processing request containing name information for a file to be processed, applies a predetermined hash function to the name information, and generates a hash value of the file to be processed; a physical-block-number acquisition unit which looks up a hash-value-range table containing at least one hash-value-range information set each of which is constituted by a hash-value range defining a range of hash values and a physical-block number uniquely indicating a data storage region in the storage device, extracts one of the at least one hash-value-range information set in which a hash-value range containing the hash value of the file to be processed is included, and acquires a physical-block number from the one of the at least one hash-value-range information set; and a directory processing unit which performs processing of a physical block in the storage device corresponding to the physical-block number acquired by the physical-block-number acquisition unit, where the processing relates to a record containing the name information and is performed in accordance with the processing request.

The above and other objects, features and advantages of the present invention will become apparent from the following description when taken in conjunction with the accompanying drawings which illustrate preferred embodiment of the present invention by way of example.

BRIEF DESCRIPTION OF THE DRAWINGS

FIG. 7 is a diagram illustrating an example of a data structure of an extent table.

FIG. 9 is a flow diagram indicating a data structure of a hash-value-range table.

DESCRIPTION OF THE PREFERRED EMBODIMENTS

Figure 1:
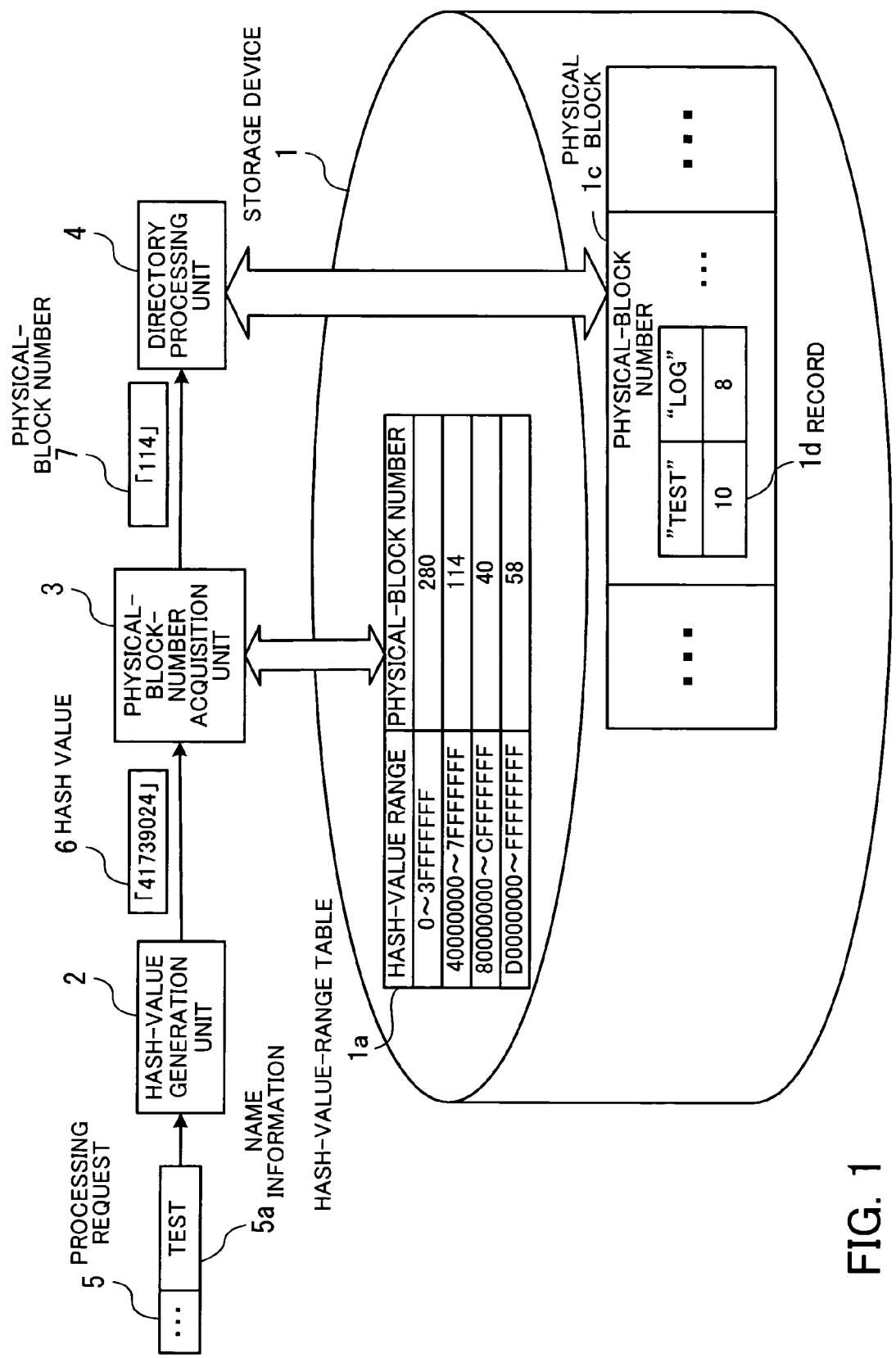
FIG. 1 is a conceptual diagram illustrating the present invention, which is realized in an embodiment.

A preferred embodiment of the present invention will be described below with reference to the accompanying drawings, wherein like reference numerals refer to like elements throughout.

First, an outline of the present invention which is realized in the embodiment is explained, and thereafter details of the embodiment are explained.

FIG. 1 is a conceptual diagram illustrating the operations of the present invention, which is realized in the embodiment. The file management program (or file management apparatus) according to the present invention is provided for management of files in a storage device 1, and comprises a hash-value generation unit 2, a physical-block-number acquisition unit 3, and a directory processing unit 4.

The storage device 1 stores a hash-value-range table 1a, which contains at least one hash-value-range information set. Each of the at least one hash-value-range information set is constituted by a hash-value range defining a range of hash values and a physical-block number uniquely indicating a data storage region in the storage device 1.

In the storage device 1, directory information is stored in a plurality of physical blocks 1c. The directory information includes records 1d, which are provided in correspondence with respective files under a directory. The files include non-directory files and directory files. Each of the records 1d contains name information (a name information item) on the name of a file and identification information for identifying management information for the file (e.g., a dinode number). The name information on each of the non-directory files is the name of the non-directory file (file name), and the name information on each of the directory files is the name of the directory file (directory name).

When the hash-value generation unit 2 receives a processing request 5 containing name information 5a for a file to be processed, the hash-value generation unit 2 applies a predetermined hash function to the name information 5a, and generates a hash value 6 for the file to be processed. The hash function is a function which generates an integer value based on the name information 5a, where the integer value has a finite bit width. The hash-value generation unit 2 passes the hash value 6 to the physical-block-number acquisition unit 3.

The physical-block-number acquisition unit 3 looks up the hash-value-range table 1a, and extracts a hash-value-range information set in which a hash-value range containing the hash value 6 of the file to be processed is included. Next, the physical-block-number acquisition unit 3 acquires a physical-block number 7 from the extracted hash-value-range information set, and passes the acquired physical-block number 7 to the directory processing unit 4.

The directory processing unit 4 performs processing of a physical block 1c in the storage device 1 corresponding to the physical-block number 7 acquired by the physical-block-number acquisition unit 3, where the processing relates to a record 1d containing the name information 5a and is performed in accordance with the processing request 5. For example, when the processing request 5 instructs deletion of the name information, the directory processing unit 4 detects a record containing the name information 5a in the physical block 1c, and deletes the record from the physical block 1c.

When a processing request 5 containing the name information 5a is inputted into the computer which executes the file management program according to the present invention as explained above, the hash-value generation unit 2 applies the predetermined hash function to the name information 5a so that a hash value 6 of a file to be processed is generated.

Next, the physical-block-number acquisition unit 3 looks up the hash-value-range table 1a, and extracts a hash-value-range information set in which a hash-value range containing the hash value 6 of the file to be processed is included. Then, the physical-block-number acquisition unit 3 acquires a physical-block number 7 from the extracted hash-value-range information set.

Thereafter, the directory processing unit 4 performs processing of a physical block 1c in the storage device 1 corresponding to the physical-block number 7 acquired by the physical-block-number acquisition unit 3, where the processing relates to a record 1d containing the name information 5a and is performed in accordance with the processing request 5.

Therefore, it is possible to access data in a directory file by simply detecting the data to be processed which is indicated by name information, in a physical block indicated by a physical-block number. That is, it is unnecessary to make a linear search of the entire directory file. Thus, efficient access to data in a directory file is enabled.

In addition, the functions illustrated in FIG. 1 can be added to existing extent-based file systems as additional functions. That is, it is easy to apply the present invention to computer systems which are already in operation.

Specifically, since every extent-based file system has extent tables of logical-block numbers and physical-block numbers, the present invention can be applied to an extent-based file system by replacing one or more extent tables (indicating correspondence between logical-block numbers and physical-block numbers) for only one or more directory files are replaced with one or more hash-value-range tables each of which indicates correspondence between physical blocks and hash values of name information items, and the functions of the hash-value generation unit 2, the physical-block-number acquisition unit 3, and the directory processing unit 4 are added to the extent-based file system.

Thus, it is possible to increase the speed of the processing performed until identification information identifying management information (e.g., dinode) for a file to be processed is acquired from the name information for the file. That is, only the physical block corresponding to the hash value obtained from the name information is required to be searched for the name information. That is, the extent of the search is limited to the physical block. Therefore, the file access time can be reduced.

Further, the present invention is particularly effective in the systems which contain a great number of files. For example, in some cases, data shared by the entire system are stored in at least one storage device connected through a network, and management information (such as dinode) for the data is stored in another device. When a body portion of data and management information for the data are stored in different storage devices as in the above example, it is possible to efficiently access the shared data.

Hereinbelow, details of the embodiment of the present invention are explained. The embodiment is an exemplary case where a body portion of data and management information for the data are stored in different storage devices.

Figure 2:
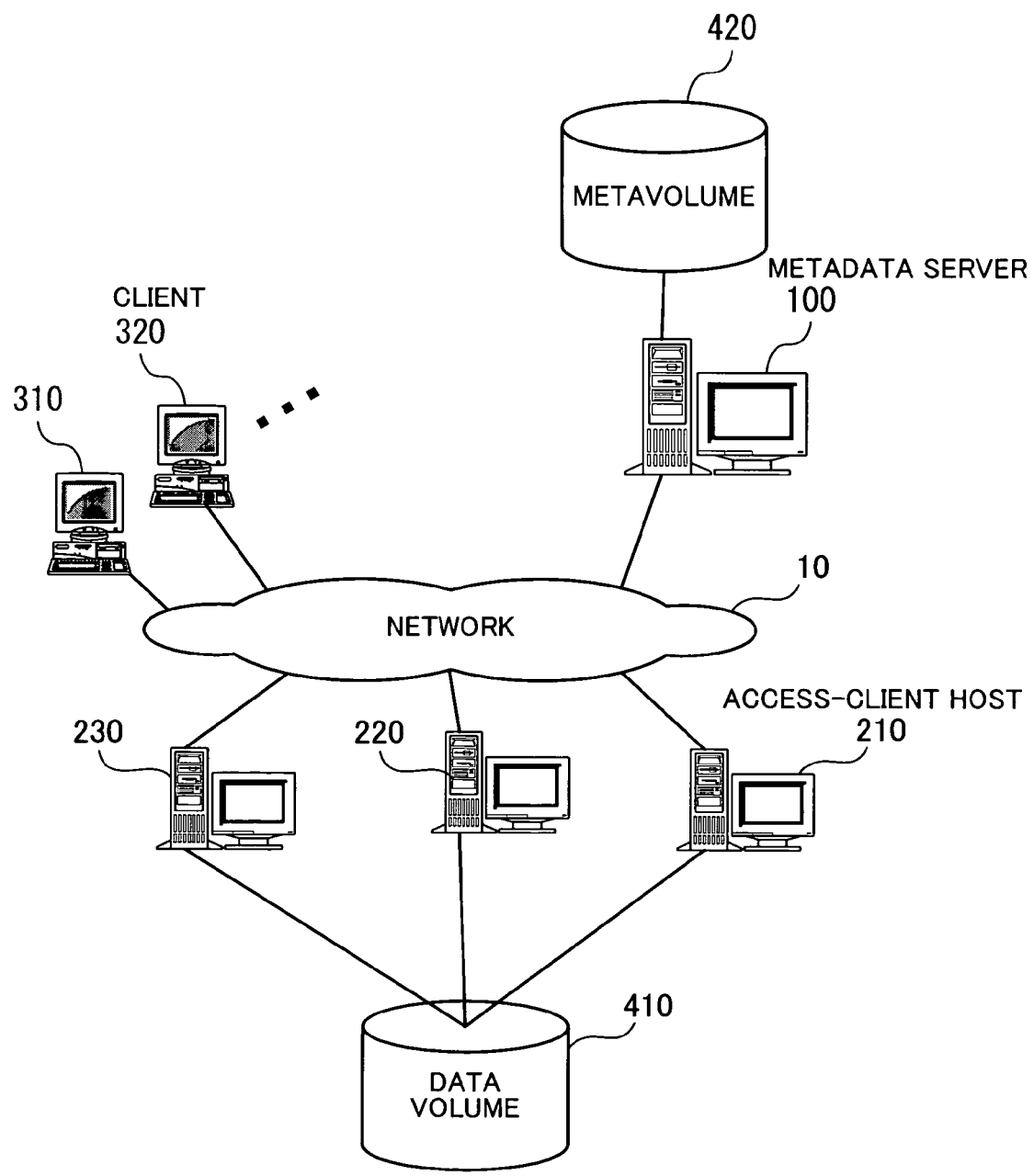
FIG. 2 is a diagram illustrating a configuration of a system in which the embodiment of the present invention is used.

FIG. 2 is a diagram illustrating a configuration of a system in which the embodiment is used. In the system of FIG. 2, a metadata server 100, access-client hosts 210, 220, and 230, and clients 310, 320, . . . are connected through a network 10.

In addition, a data volume 410 is connected to the access-client hosts 210, 220, and 230. The data volume 410 is a storage device (e.g., a hard disk drive) in which data of non-directory files shared by the entire system are stored. The data in the data volume 410 are stored on a file-by-file basis. Further, a metavolume 420 is connected to the metadata server 100. The metavolume 420 is a storage device (e.g., a hard disk drive) in which management information for the files are stored.

The metadata server 100 manages the files in the data volume 410 by using the metavolume 420. Specifically, when the metadata server 100 receives a request from the access-client host 210, 220, or 230, the metadata server 100 returns a response indicating (by a physical-block number) the location of data constituting a file corresponding to a file name. In addition, when the metadata server 100 receives from the access-client host 210, 220, or 230 a request for processing of a directory file, the metadata server 100 performs the processing of the designated directory file, and outputs a result of the processing.

The access-client hosts 210, 220, and 230 access the non-directory files in the data volume 410 in response to requests from the clients 310, 320, . . . When the access-client hosts 210, 220, and 230 access the files, the access-client hosts 210, 220, and 230 acquire a physical-block number of a physical block containing requested data from the metadata server 100 based on the name information and intrafile offset information, and access the data volume 410 based on the acquired physical-block number.

The clients 310, 320, . . . are terminals operated by users. The clients 310, 320, . . . transmit requests for file access and the like to the access-client hosts 210, 220, and 230 in response to the users' manipulation inputs.

Figure 3:
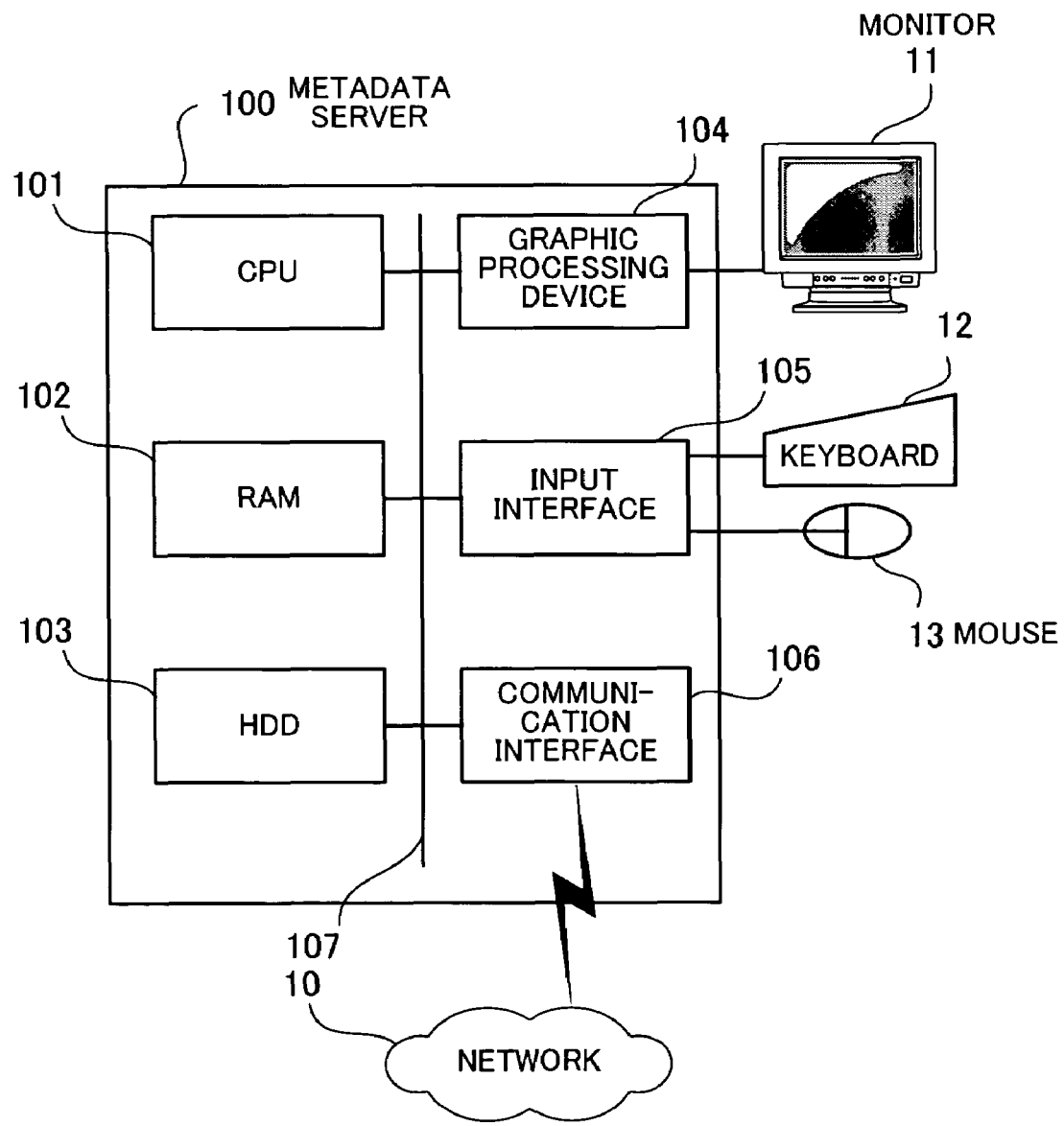
FIG. 3 is a diagram illustrating a hardware construction of a metadata server used in the embodiment.

FIG. 3 is a diagram illustrating a hardware construction of the metadata server used in the embodiment. The entire metadata server 100 is controlled by a CPU (central processing unit) 101, to which a RAM (random access memory) 102, an HDD (hard disk drive) 103, a graphic processing device 104, an input interface 105, and a communication interface 106 are connected through a bus 107.

The RAM 102 temporarily stores at least portions of an OS (operating system) program and application programs which are executed by the CPU 101, as well as various types of data necessary for processing by the CPU 101. The HDD 103 stores the OS and application programs.

A monitor 11 is connected to the graphic processing device 104, which makes the monitor 11 display an image on a screen in accordance with an instruction from the CPU 101. A keyboard 12 and a mouse 13 are connected to the input interface 105, which transmits signals sent from the keyboard 12 and the mouse 13, to the CPU 101 through the bus 107.

The communication interface 106 is connected to the network 10, and exchanges data with other computers through the network 10.

By using the above hardware construction, it is possible to realize the functions of the metadata server 100. In addition, each of the access-client hosts 210, 220, and 230 and the clients 310, 320, . . . can also be realized by using a similar hardware construction.

Hereinbelow, details of the file-access function of the system are explained by taking as an example a case where a file-access request is outputted from the client 310 to the access-client host 210.

Figure 4:
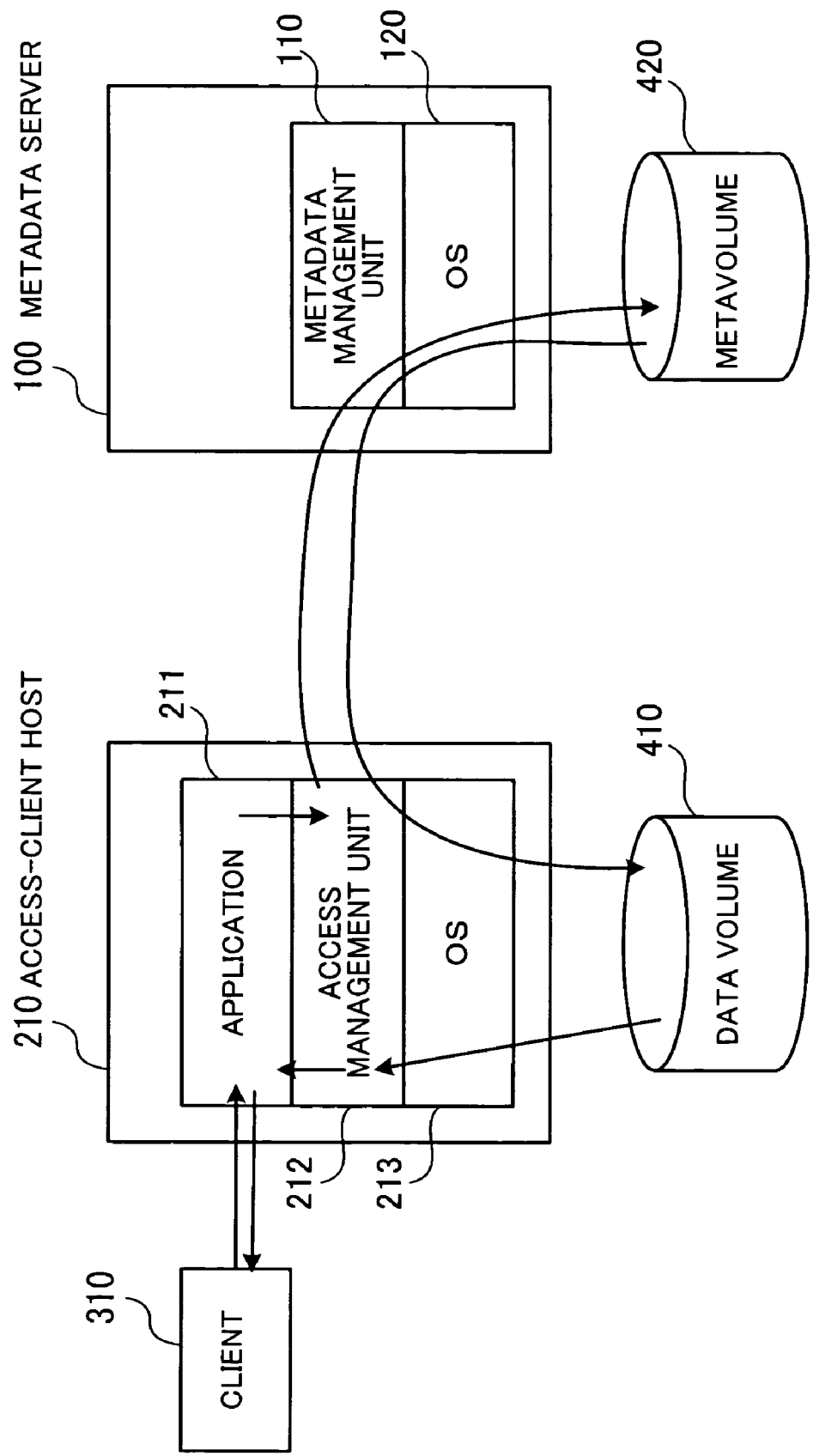
FIG. 4 is a conceptual diagram illustrating a flow of operations for file access.

FIG. 4 is a conceptual diagram illustrating a flow of operations for file access. The access-client host 210 has the functions of an application 211, an access management unit 212, and an OS (operating system) 213. The application 211 provides various services to the client 310. The access management unit 212 manipulates the files in the data volume 410 in response to file-access requests received through the application 211. The OS 213 controls the entire access-client host 210, and comprises a file system for accessing the data volume 410.

The metadata server 100 has the functions of a metadata management unit 110 and an OS (operating system) 120. The OS 120 controls the entire metadata server 100, and comprises a file system for accessing the metavolume 420.

In the system having the construction illustrated in FIG. 4, when a processing request is outputted from the client 310 to the access-client host 210, the application 211 in the access-client host 210 performs the requested processing. When the processing includes access to a file, the application 211 passes to the access management unit 212 a request for access to the file, and then the access management unit 212 sends to the metadata server 100 an inquiry about the location (physical-block number) of data constituting the file, where intrafile offset information and name information designated in the request passed by the application 211 are indicated in the inquiry.

The metadata management unit 110 accesses the metavolume 420 through the OS 120, and performs processing in accordance with the request from the access-client host 210. The processing is different according to whether the object to be processed is management information for a non-directory file or management information for a directory file.

In the case where the object to be processed is management information for a non-directory file, the metadata management unit 110 accesses the metavolume 420, and acquires a physical-block number corresponding to the combination of the intrafile offset information and the name information designated by the access-client host 210. Then, the metadata management unit 110 sends the acquired physical-block number to the access-client host 210.

On the other hand, in the case where the object to be processed is management information for a directory file, the metadata management unit 110 accesses the metavolume 420, and performs processing of the directory file in accordance with the request from the access-client host 210. Then, the metadata management unit 110 sends the result of the processing to the access-client host 210.

The access management unit 212 in the access-client host 210 accesses the requested file in the data volume 410 based on the physical-block number received from the metadata server 100, and returns a result of the access to the application 211. The application 211 completes the processing including the access to the file, and sends a result of the processing to the client 310.

As explained above, the access-client host 210 can access a file stored in the data volume 410, and change data in a directory file in the metavolume 420.

Next, the functions of the metadata management unit 110 are explained in detail below.

Figure 5:
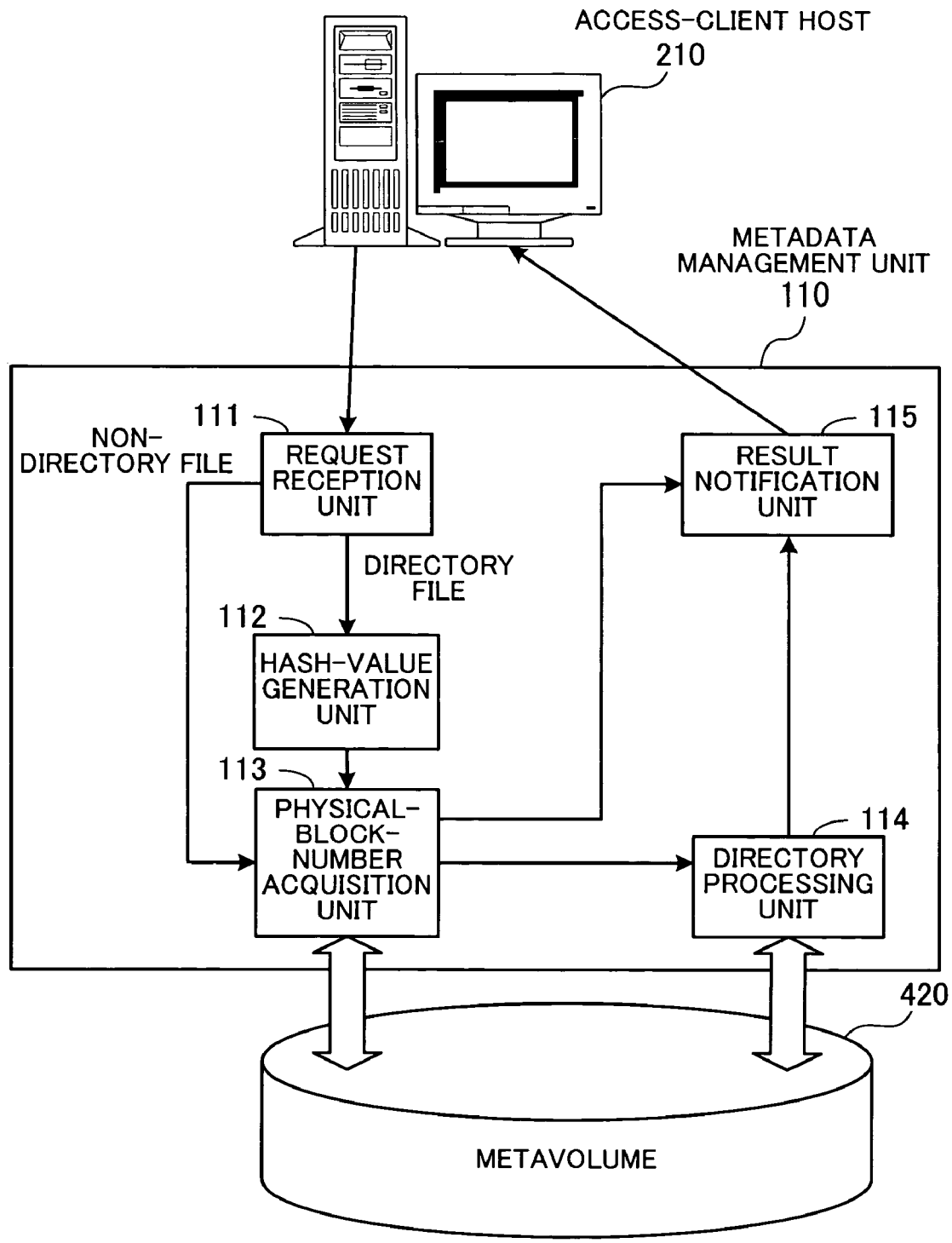
FIG. 5 is a block diagram illustrating the functions of a metadata management unit.

FIG. 5 is a block diagram illustrating the functions of the metadata management unit. The metadata management unit 110 comprises a request reception unit 111, a hash-value generation unit 112, a physical-block-number acquisition unit 113, a directory processing unit 114, and a result notification unit 115.

The request reception unit 111 receives a request from the access-client host 210. When the object to be processed is a non-directory file, the request reception unit 111 passes the processing request to the physical-block-number acquisition unit 113. On the other hand, when the object to be processed is a directory file, the request reception unit 111 passes the processing request to the hash-value generation unit 112.

When the above processing request contains information on a name (i.e., name information), the hash-value generation unit 112 converts the name information into a hash value by using a predetermined hash function. For example, when the processing request is a search request in which a file name is designated, the hash-value generation unit 112 converts the designated file name into a hash value. Then, the hash-value generation unit 112 passes the hash value and the processing request to the physical-block-number acquisition unit 113.

For example, the hash function used for generating the hash value may be one of the following examples, where it is assumed that hash value is represented by 32-bit data.

FIRST EXAMPLE

In the first example of the hash function, character codes which represent all characters constituting the name information are summed. When the sum of the character codes exceeds $2^{32}-1$, one or more overflow bits (for example, one or more bits of the sum which are more significant than the thirty-second bit of the sum) are discarded.

SECOND EXAMPLE

In the second example of the hash function, a plurality of portions of the character string constituting the name information are extracted from the top of the character string, where each of the plurality of portions have an appropriate byte width (e.g., four bytes). Every time a portion of the character string is extracted, the XOR (exclusive logical sum) of the portion and the calculated value of the XOR with another portion of the character string which is previously extracted is calculated. When extraction of the plurality of portions and calculation of the XOR with the finally extracted portion are completed, the finally calculated value of the XOR is obtained as the hash value.

Referring back to FIG. 5, the physical-block-number acquisition unit 113 looks up the management information stored in the metavolume 420, and acquires a physical-block number based on the received processing request. For example, when the target object of the processing request is a non-directory file, the physical-block-number acquisition unit 113 acquires an extent table corresponding to the file designated in the processing request as the target object of the processing, and the physical-block number of a physical block containing data in the file which is to be processed. Then, the physical-block-number acquisition unit 113 passes the acquired physical-block number to the result notification unit 115.

On the other hand, when the target object of the processing request is a directory file, the physical-block-number acquisition unit 113 acquires a hash-value-range table for the directory file to be processed, and the physical-block number of a physical block which contains information on a file name designated in the processing request, based on the hash value of the file name. Then, the physical-block-number acquisition unit 113 passes the acquired physical-block number and the processing request to the directory processing unit 114.

When the directory processing unit 114 receives the physical-block number and the processing request from the physical-block-number acquisition unit 113, the directory processing unit 114 accesses the physical block in the metavolume 420 corresponding to the physical-block number, acquires data in the physical block, and performs processing of the acquired data in accordance with the processing request. When the data is updated by the processing, the directory processing unit 114 stores the updated data in the physical block.

Next, the data structures of the data volume 410 and the metavolume 420 are explained below.

Figure 6:
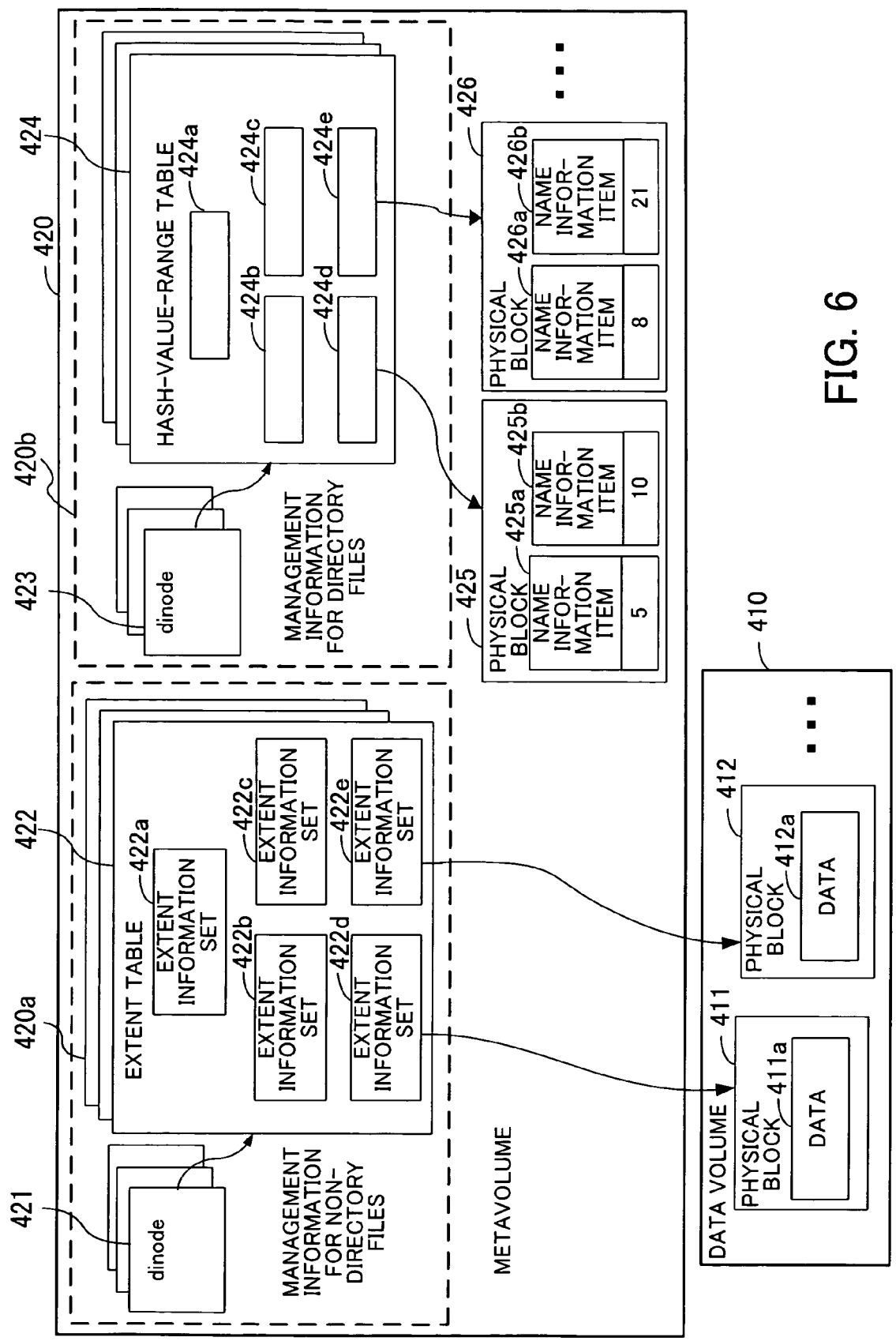
FIG. 6 is a diagram illustrating an example of a data structure in a data volume and a metavolume.

FIG. 6 is a diagram illustrating an example of a data structure in the data volume 410 and the metavolume 420.

The storage regions in the data volume 410 are realized by a plurality of physical blocks 411, 412, . . . . Each of the plurality of physical blocks 411, 412, . . . stores data 411*a*, 412*a*, . . . of non-directory files.

The metavolume 420 stores management information 420*a* for non-directory files and management information 420*b* for directory files, and the management information 420*a* and the management information 420*b* are stored in predetermined physical blocks in the metavolume 420.

The management information 420*a* for non-directory files is constituted by a plurality of structures 421 called dinodes and a plurality of extent tables 422. Each of the extent tables 422 is associated with one of the dinodes 421. Each of the dinodes 421 is provided for a file, contains various management information including logical-block numbers of data in non-directory files, and does not contain a file name and a body portion of data. In addition, each of the dinodes 421 contains a pointer to a corresponding one of the extent tables 422.

Each of the extent tables 422 contains at least one extent information set (e.g., the extent information sets 422*a*, 422*b*, 422*c*, 422*d*, and 422*e*) corresponding to at least one physical block which contains data of at least one non-directory file. Therefore, it is possible to acquire a physical-block number corresponding to a logical-block number of data constituting a non-directory file by looking up the at least one extent information set (422*a*, 422*b*, 422*c*, 422*d*, and 422*e*). In the example of FIG. 6, the extent information set 422*d* corresponds to the physical block 411, and the extent information set 422*e* corresponds to the physical block 412. Details of the contents of the extent tables 422 are explained later with reference to FIG. 7.

The management information 420*b* for directory files is constituted by a plurality of dinodes 423 and hash-value-range tables 424. Each of the hash-value-range tables 424 is associated with one of the dinodes 423. Each of the dinodes 423 is provided for a directory file, contains various management information including information on restriction of access to the directory file, and does not contain a directory-file name and a body portion of data. In addition, each of the dinodes 423 contains a pointer to a corresponding one of the hash-value-range tables 424.

Each of the hash-value-range tables 424 contains at least one hash-value-range information set (e.g., the hash-value-range information sets 424*a*, 424*b*, 424*c*, 424*d*, and 424*e*) corresponding to at least one physical block which contains data of at least one file. Therefore, it is possible to acquire a physical-block number of a physical block containing information on a file, based on the hash value of the file name, by looking up the at least one hash-value-range information set (424*a*, 424*b*, 424*c*, 424*d*, and 424*e*). In the example of FIG. 6, the hash-value-range information set 424*d* corresponds to the physical block 425, and the hash-value-range information set 424*e* corresponds to the physical block 426. Details of the contents of the hash-value-range tables 424 are explained later with reference to FIG. 9.

The plurality of physical blocks 425, 426, . . . store contents of the directory files. The plurality of physical blocks 425, 426, . . . contain records 425a, 425b, 426a, 426b . . . . In each of the records 425a, 425b, 426a, 426b, . . . , information on a file immediately under the directory is registered. Each of the records 425a, 425b, 426a, 426b, . . . is constituted by name information for the file (i.e., information indicating the name of the file) and the dinode number of the file.

As explained above, the off-core control data (control information managed outside the main memory) for each directory file include three types of main elements, a dinode 423, a hash-value-range table 424, and a physical block 425 or 426.

All of the files (not only the directory files) are managed by mainly using the data structures as the dinodes 421 and 423. In each of the dinodes 421 and 423, the data type, the file types, and the information on access restriction, and the like of the corresponding file are contained.

Although the dinodes 421 and 423 can contain at least a portion of the extent information sets 422a, 422b, 422c, 422d, and 422e and the hash-value-range information sets 424a, 424b, 424c, 424d, and 424e, according to the present embodiment, all of the extent information sets 422a, 422b, 422c, 422d, and 422e are contained in the extent tables 422, and all of the hash-value-range information sets 424a, 424b, 424c, 424d, and 424e are contained in the extent tables 424. Therefore, each of the dinodes 421 contains a pointer to a corresponding one of the extent tables 422, and each of the dinodes 423 contains a pointer to a corresponding one of the hash-value-range tables 424.

Each of the extent tables 422 indicates correspondence between at least one logical-block range and at least one physical-block range. The logical-block range is a constituent element of a virtually continuous file and has a fixed length. On the other hand, the physical block is an actually present substance of a file realized on a storage device. Generally, data constituting an arbitrary file is not necessarily stored in a continuous region in a storage device. Therefore, the extent tables 422 are necessary for obtaining information on at least one location of at least one physical block corresponding to each logical block. The extent information sets 422a, 422b, 422c, 422d, and 422e contain the starting number of each logical-block range and at least one starting number and at least one width of at least one physical-block range corresponding to the logical-block range.

On the other hand, each of the hash-value-range tables 424 corresponding to the directory files contains hash-value-range information indicating correspondence between at least one hash-value range and at least one physical block. Information on the location of each physical block is managed based on the hash-value-range information. Records of files for which hash values within a hash-value range indicated by each hash-value-range information item are generated are stored in a physical block the location of which is also indicated by the hash-value-range information item.

Each of the physical blocks 411, 412, 425, and 426 stores user data of non-directory files or directory data of directory files. Each extent information set for a non-directory file designates by a physical-block range at least one physical block which stores the data of the non-directory file. The length of the physical-block range is variable, and stored in the extent information set. Therefore, a single extent information set may designate a plurality of contiguous physical blocks in a storage device.

On the other hand, in each of the hash-value-range information items for the directory files, the length of each physical-block range is fixed. In the present embodiment, the length of each physical-block range is set to one, which is the length of a single physical block.

Next, an example of a data structure of each extent table and a method for accessing a non-directory file by use of an extent table are explained below.

FIG. 7 is a diagram illustrating an example of the data structure of one of the extent tables. In each of the extent tables 422, logical-block numbers, data lengths, and physical-block numbers are registered in association with each other, and each of the extent information sets 422a, 422b, . . . is constituted by a combination of a logical-block number, a data length, and a physical-block number which are associated with each other.

The logical-block number is the number indicating the top of a logical block containing data which constitute a non-directory file, and the data length is the length of the data stored in the logical block. The physical-block number is an identification number of the leading physical block in a region of the data volume 410 in which the data contained in the corresponding logical block are stored (i.e., a physical-block range).

By using the above extent tables 422, the following access operations are performed.

Figure 8:
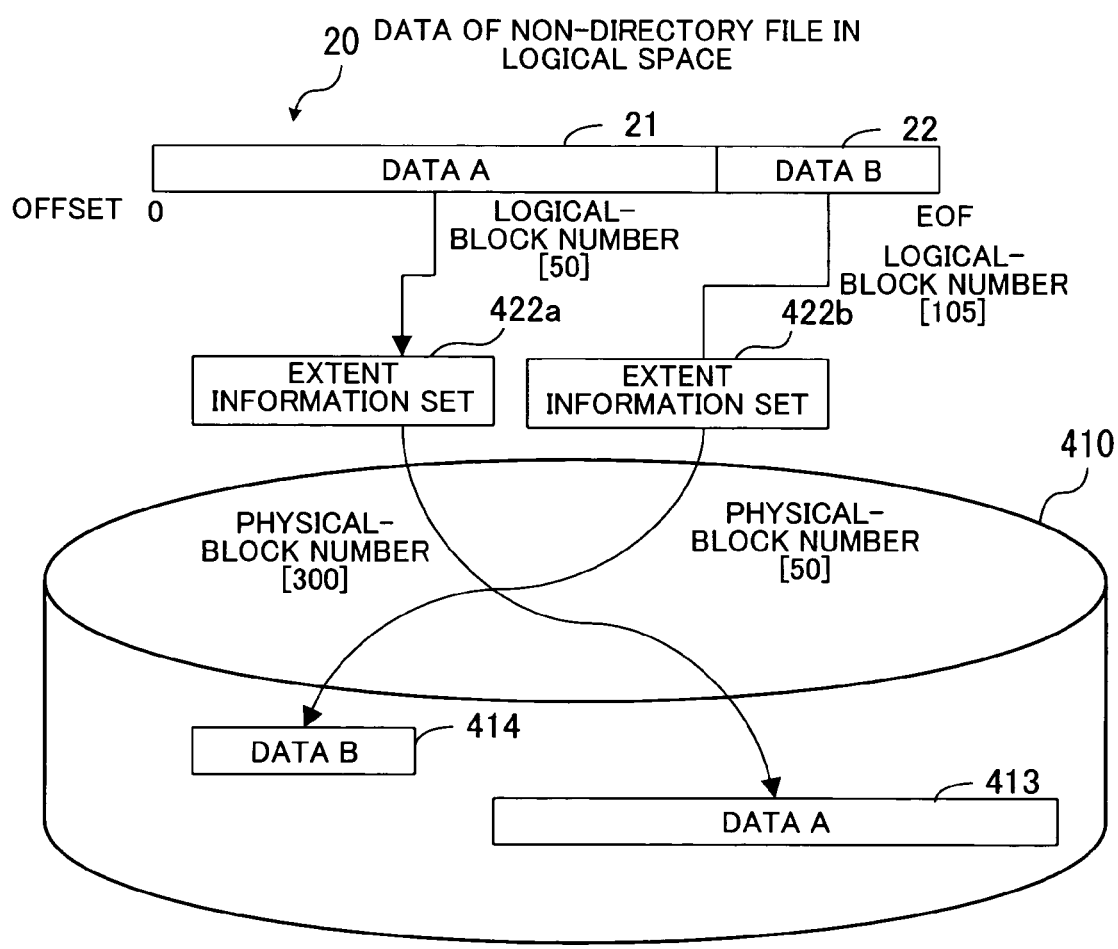
FIG. 8 is a diagram illustrating operations of accessing a non-directory file.

FIG. 8 is a diagram illustrating operations of accessing a non-directory file. In FIG. 8, reference numeral 20 denotes an example of data of a non-directory file in a logical space. In order to access an arbitrary one of data items in the non-directory file, the object to be accessed is designated by an offset from the top of the non-directory file. In the example of FIG. 8, the data area 21 containing data contents A and having a predetermined length is arranged from the top of the non-directory file, and the data area 22 containing data contents B follows the data area 21 and extends to the end of the file (EOF).

For example, when the access management unit 212 receives from the application 211 a request for access to predetermined data in an arbitrary file, the access management unit 212 acquires information on the offset of the data (indicating the distance from the top of the file to the data), and sends a processing request to the metadata server 100, where the processing request contains the name of the file and the information on the offset.

The request reception unit 111 in the metadata server 100 recognizes that access to a non-directory file is requested, and passes the processing request to the physical-block-number acquisition unit 113. Then, the physical-block-number acquisition unit 113 acquires from the metavolume 420 a dinode for the non-directory file.

Specifically, when the physical-block-number acquisition unit 113 has the dinode number corresponding to the non-directory file, the physical-block-number acquisition unit 113 acquires the dinode corresponding to the dinode number. When the physical-block-number acquisition unit 113 does not have the dinode number for the non-directory file, the physical-block-number acquisition unit 113 acquires the dinode number corresponding to the name of the file from a directory file corresponding to a directory under which the above non-directory file exists. Then, the physical-block-number acquisition unit 113 acquires the dinode corresponding to the acquired dinode number.

The physical-block-number acquisition unit 113 looks up the acquired dinode, and acquires a logical-block number based on the offset of the data to be accessed. Further, the physical-block-number acquisition unit 113 looks up an extent table corresponding to the dinode, and acquires a physical-block number corresponding to the acquired logical-block number.

Then, the physical-block-number acquisition unit 113 passes the acquired physical-block number to the result notification unit 115, which passes the physical-block number to the access management unit 212. Thus, the access management unit 212 can access the corresponding physical block in the data volume 410.

In the example of FIG. 8, when the logical-block number "50" is obtained for access to the data contents A, the extent information set 422a in the corresponding extent table 422 as illustrated in FIG. 7 is looked up, and the physical-block number "300" is obtained based on the extent information set 422a. Thus, the access management unit 212 can access the physical block 413 in the data volume 410 in which the data contents A are stored.

On the other hand, when the logical-block number "105" is obtained for access to the data contents B, the physical-block number "50" is obtained based on the extent information set 422b in the corresponding extent table 422. Thus, the access management unit 212 can access the physical block 414 in the data volume 410 in which the data contents B are stored.

Next, an example of a data structure of each hash-value-range table and a method for accessing a directory file by use of a hash-value-range table are explained below.

FIG. 9 is a flow diagram indicating a data structure of one of the hash-value-range tables. In each of the hash-value-range tables 424, the starting values of hash-value ranges, data lengths, and physical-block numbers are registered in association with each other, and each of the hash-value-range information sets 424a, 424b, . . . is constituted by a combination of the starting value of a hash-value range, a data length, and a physical-block number which are associated with each other.

Each hash-value range is a range of hash values generated from file names corresponding to a hash-value-range information set, and the starting value of each hash-value range is, for example, the minimum hash value in the hash-value range. The data length indicates the length of the hash-value range. Each hash-value range is uniquely determined by the starting value and the length of the hash-value range. The physical-block number is an identification number of the physical block in which records containing information on the names of files corresponding to the hash-value range are stored.

By using the above hash-value-range tables 424, the following access operations are performed.

Figure 10:
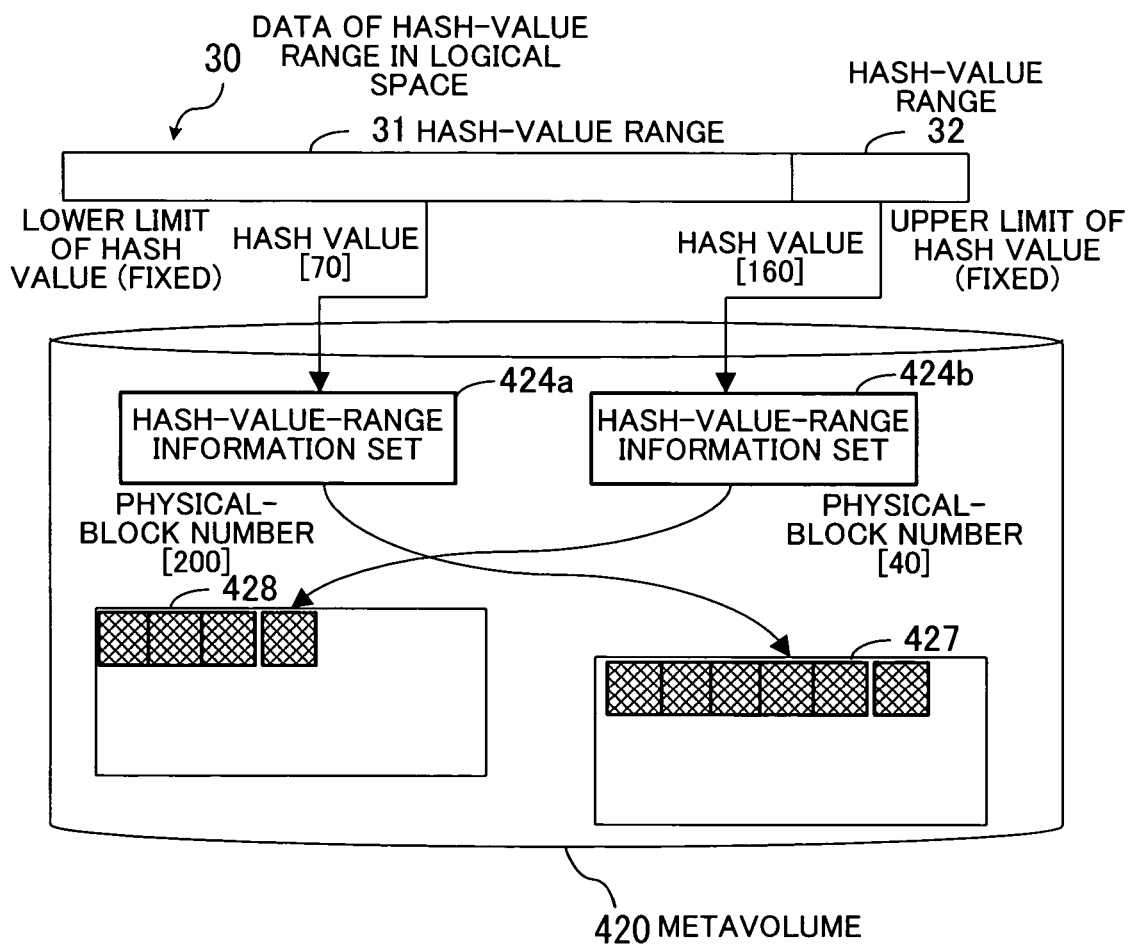
FIG. 10 is a diagram illustrating operations of accessing a directory file.

FIG. 10 is a diagram illustrating operations of accessing a directory file. In FIG. 10, reference numeral 30 denotes an example of data of a hash-value range in a logical space. In the example of FIG. 10, the entire hash-value range 30 extending from its lower limit value to its upper limit value is divided into a hash-value range 31 and a hash-value range 32.

In order to access a record corresponding to an arbitrary file under the directory file of FIG. 10, the hash-value generation unit 112 generates a hash value based on the file name. Then, the physical-block-number acquisition unit 113 looks up a corresponding one of the hash-value-range tables 424 in the metavolume 420, and acquires a physical-block number corresponding to the generated hash value.

For example, when the access management unit 212 in the access-client host 210 receives from the application 211 request for addition of a file to an arbitrary directory, the access management unit 212 sends to the metadata server 100 a processing request containing a file name and information indicating designation of a directory (by a file path in a tree structure).

The request reception unit 111 in the metadata server 100 recognizes that access to the directory file is requested, and passes the processing request to the hash-value generation unit 112. The hash-value generation unit 112 generates a hash value from the file name in accordance with a predetermined hash function, and passes the generated hash value and the processing request to the physical-block-number acquisition unit 113.

The physical-block-number acquisition unit 113 acquires from the metavolume 420 a dinode corresponding to the directory file to be processed. Then, the physical-block-number acquisition unit 113 looks up one of the hash-value-range tables 424 corresponding to the acquired dinode, extracts a hash-value-range information set which includes a hash-value range containing the received hash value, and acquires a physical-block number corresponding to the hash value based on the extracted hash-value-range information set.

The physical-block-number acquisition unit 113 passes the acquired physical-block number to the directory processing unit 114, which performs processing of data in the physical block designated by the received physical-block number in accordance with the processing request. For example, when the processing request instructs addition of a file to the files subordinates to the directory, the directory processing unit 114 stores a record for the file to be added, in the corresponding physical block, where the record contains the file name and a dinode number. The result of the processing performed by the directory processing unit 114 (e.g., a message that the addition of the file is successfully completed) is passed to the result notification unit 115, which transfers the processing result to the access management unit 212.

For example, in the case where the one of the hash-value-range tables 424 has the contents illustrated in FIG. 9, the physical-block number "200" is obtained based on the hash-value-range information set 424a when the hash value generated from the file name is "70." Therefore, the processing is performed on the physical block 427 corresponding to the obtained physical-block number "200." On the other hand, the physical-block number "40" is obtained based on the hash-value-range information set 424b when the hash value generated from the file name is "160." Therefore, in this case, the processing is performed on the physical block 428 corresponding to the obtained physical-block number "40."

As explained above, it is possible to perform arbitrary processing on data constituting a directory file. The following four types of processing are mainly requested to be performed on directory files:

(i) Insertion of Name (Direnter)

When the application 211 outputs an instruction to add a file to files subordinate to a directory, the access management unit 212 outputs a processing request for insertion of a name into the directory file. In the UNIX-based operating systems, when an I/O request such as CREATE, MKDIR, or SYMLINK occurs, a file is created under a designated parent directory. (UNIX is a registered trademark of The Open Group.) At this time, a record of the created file is inserted into the directory file of the parent directory, where the record contains name information and a dinode number.

(ii) Deletion of Name (Dirremove)

When the application 211 outputs an instruction to delete a file from files subordinate to an arbitrary directory, the access management unit 212 outputs a processing request for deletion of the name from the directory file. In the UNIX-based operating systems, when an I/O request such as REMOVE or RMDIR occurs, the name information for the designated file is deleted from the parent directory of the designated file.

(iii) Search for Name (Lookup)

When the application 211 outputs an instruction to confirm existence of a file having an arbitrary file name under a directory, the access management unit 212 outputs a processing request for searching the directory file for the name. In the UNIX-based operating systems, when a LOOKUP request occurs, the files under the designated directory are searched for the file (non-directory file or directory file) having the designated name.

(iv) Listing of Names (Readdir)

When the application 211 outputs an instruction to acquire file names of all files under a directory, the access management unit 212 outputs a processing request for listing the names. In the UNIX-based operating systems, when a READDIR request occurs, the names of all files (and directories) under the designated parent directory are listed.

Hereinbelow, a sequence of processing performed by the metadata management unit 110 when a request for each of the above four types of processing occurs is explained with reference to a flow diagram.

Figure 11:
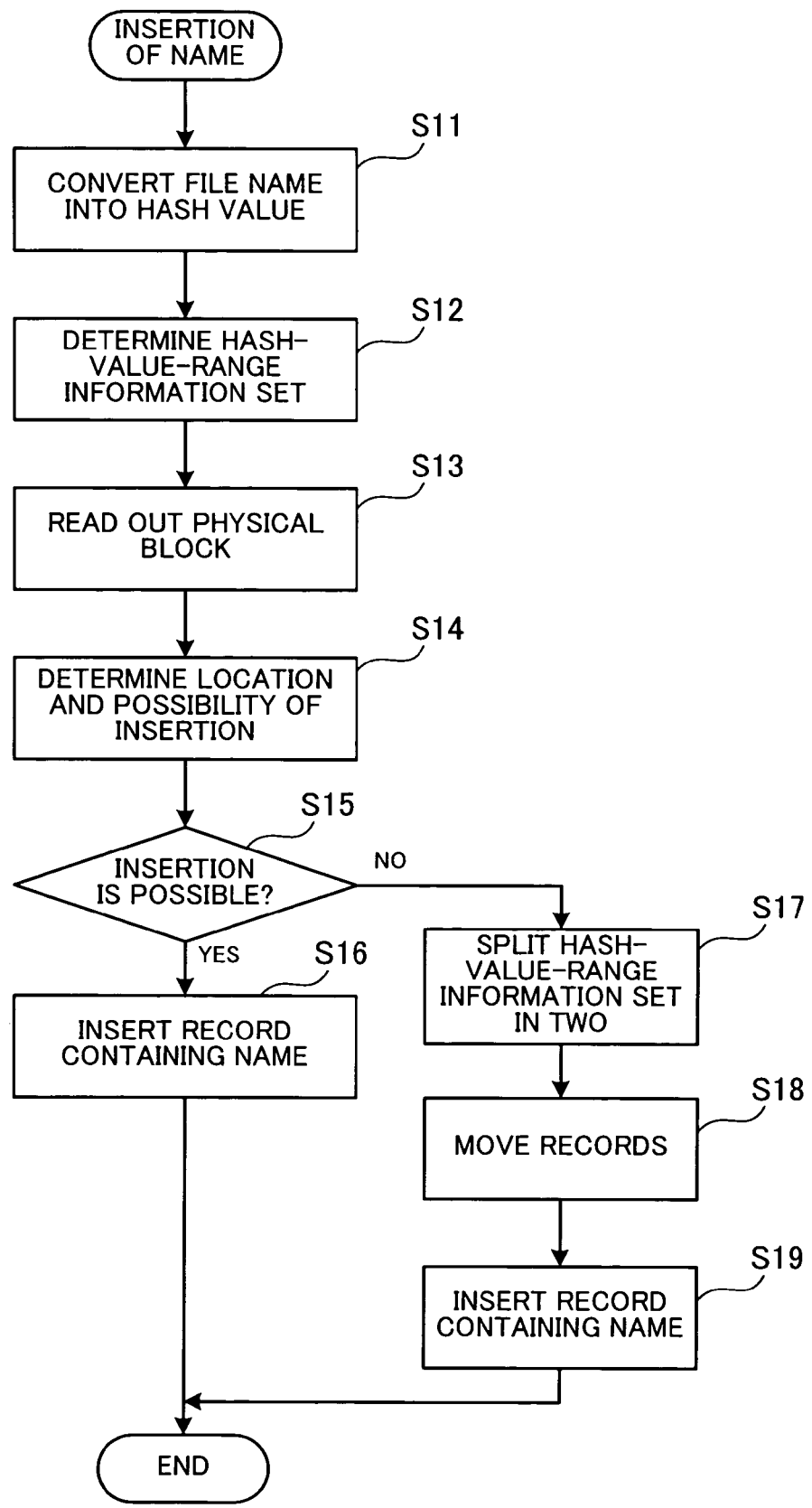
FIG. 11 is a flow diagram indicating a sequence of processing for inserting a name.

FIG. 11 is a flow diagram indicating a sequence of processing for inserting a name. The processing of FIG. 11 is performed when the access management unit 212 outputs to the metadata management unit 110 a request for insertion of a name. The processing illustrated in FIG. 11 is explained below step by step.

[Step S11] The request reception unit 111 passes the above request to the hash-value generation unit 112. Then, the hash-value generation unit 112 converts the file name into a hash value. Specifically, the hash-value generation unit 112 converts the file name which is designated to be inserted, into an integer value represented by a finite number of bits, by applying a hash function to the designated file name. This integer value is the hash value, and passed to the physical-block-number acquisition unit 113.

[Step S12] The physical-block-number acquisition unit 113 determines a hash-value-range information set. Specifically, the physical-block-number acquisition unit 113 looks up a dinode corresponding to the directory file to be processed, and acquires the corresponding hash-value-range table. Then, the physical-block-number acquisition unit 113 determines one of hash-value-range information sets registered in the acquired hash-value-range table which includes a hash-value range containing the hash value obtained in step S11. In addition, the physical-block-number acquisition unit 113 passes to the directory processing unit 114 a physical-block number included in the determined hash-value-range information set.

[Step S13] The directory processing unit 114 reads out the physical block into which a record is to be inserted. Specifically, the directory processing unit 114 reads out all data stored in the physical block corresponding to the physical-block number received from the physical-block-number acquisition unit 113.

[Step S14] The directory processing unit 114 determines a location of insertion and the possibility of the insertion. Specifically, the directory processing unit 114 searches the physical block read out in step S13 for a location in which a record having the designated file name can be stored. Further, the directory processing unit 114 determines whether or not the amount of data (the number of bytes or records) in the physical block exceeds a predetermined upper limit (i.e., whether or not an overflow occurs) when the record is newly inserted. When the amount of data (the number of bytes or records) exceeds the predetermined upper limit, it is determined that the insertion is impossible.

[Step S15] The operation of the directory processing unit 114 branches according to whether or not the insertion is determined to be possible. When the insertion is possible, the operation goes to step S16. When the insertion is impossible, the operation goes to step S17.

[Step S16] The directory processing unit 114 inserts a record containing name information and the dinode into the data in the physical block which is read out in step S13, puts the updated data back into the above physical block, and the processing of FIG. 11 is completed.

[Step S17] The directory processing unit 114 splits the hash-value-range information set determined in step S12 into two hash-value-range information sets based on hash values. That is, the directory processing unit 114 splits the hash-value range in the hash-value-range information set determined in step S12 into two hash-value ranges, and generates new hash-value-range information sets respectively corresponding to the two hash-value ranges. Then, the physical-block number obtained in step S12 is set as the physical-block number in one of the two hash-value-range information sets corresponding to smaller hash values, and a physical-block number of an available physical block in the metavolume 420 is set as the physical-block number in the other of the two hash-value-range information sets corresponding to greater hash values.

[Step S18] The directory processing unit 114 moves records in the physical block used before the splitting operation in step S17 to the newly acquired physical block. Specifically, the physical block corresponding to the hash-value-range information set which is newly generated by the splitting operation in step S17 is allocated for use (secured as a new region for use). In addition, the directory processing unit 114 moves half of the records in the physical block used before the splitting operation, to the newly allocated physical block.

[Step S19] The directory processing unit 114 selects one of the hash-value-range information sets split in step S17 so that the hash-value range in the selected one contains the hash value generated in step S11, and inserts a record containing the name information and the dinode, into the data in the physical block corresponding to the selected hash-value-range information set. Then, the directory processing unit 114 puts the updated data back into the above physical block, and the processing of FIG. 11 is completed.

As explained above, in the processing for inserting a name, the hash-value-range information set corresponding to the physical block into which insertion is to be made is split when the available capacity of the physical block reaches a predetermined lower limit. Therefore, it is possible to maintain the size of the physical block corresponding to each hash-value-range information set nearly constant.

Although the hash-value range is split in two in step S17, it is possible to shift the split point according to the distribution of hash values corresponding to name information items stored in the physical block corresponding to the hash-value-range information set before the splitting.

FIGS. 12A to 12E are diagrams schematically illustrating a plurality of states of the hash-value-range information and storage of records in one or more physical blocks, and provided for explanation of splitting of a hash-value range. In the example of FIGS. 12A to 12E, the hash values are represented by 32-bit data, and records stored in physical blocks are indicated by double hatched areas.

Figure 12:
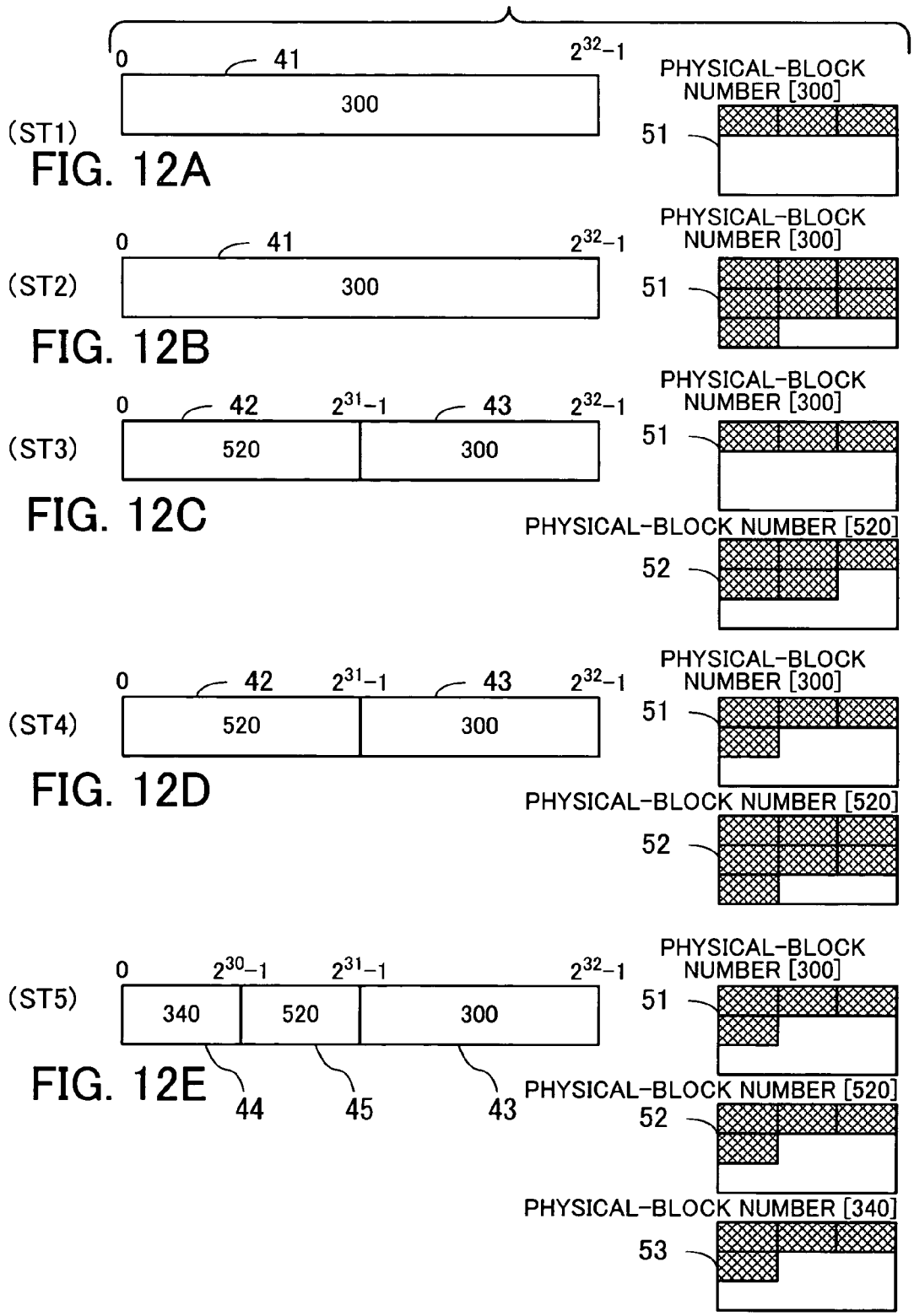
FIGS. 12A to 12E are diagrams schematically illustrating a plurality of states of the hash-value-range information and storage of records in one or more physical blocks, and provided for explanation of splitting of a hash-value range.

The first state (ST1) illustrated in FIG. 12A is a state immediately after production of a directory file. In this state, a hash-value range 41 extending from 0 to $2^{32}-1$ and a physical-block number "300" are set in the hash-value-range information set, and records are stored in the physical block 51 corresponding to the physical-block number "300."

The second state (ST2) illustrated in FIG. 12B is a state in which the amount of records (the amount of data of the records or the number of records) stored in the physical block 51 is increased. In this state, the available capacity in the physical block 51 is small. When a processing request for insertion of a name occurs in the second state (ST2), splitting of the hash-value range 41 is performed.

The third state (ST3) illustrated in FIG. 12C is a state after the hash-value range 41 is split into the hash-value ranges 42 and 43. In this example, the hash-value range 41 is equally split in two, the physical block 52 corresponding to the physical-block number "520" is associated with the hash-value range 42, and the physical block 51 corresponding to the physical-block number "300" is associated with the hash-value range 43. In correspondence with the allocation of the new physical block 52, the records which contain name information items corresponding to hash values included in the hash-value range 43 are moved from the physical block 51 to the physical block 52.

The fourth state (ST4) illustrated in FIG. 12D is a state in which the amount of records stored in the physical block 52 is increased. When the amount of records stored in the physical block 52 is further increased in the fourth state (ST4), splitting of the hash-value range 42 is performed.

The fifth state (ST5) illustrated in FIG. 12E is a state after the hash-value range 42 is split into the hash-value ranges 44 and 45. In this example, the physical block 53 corresponding to the physical-block number "340" is associated with the hash-value range 44, and the physical block 52 corresponding to the physical-block number "520" is associated with the hash-value range 45.

As explained above, when the amount of records (the amount of data or the number of bytes or records) in a physical block reaches a predetermined upper limit, splitting of the corresponding hash-value range is performed, new hash-value-range information sets are generated, and a new physical block is allocated. Therefore, even when the number of files under a directory increases, the number of records in each physical block does not become too great. Thus, it is always possible to make a linear search of data in each physical block based on name information in a short time.

Next, a sequence of processing for deleting a name is explained below.

Figure 13:
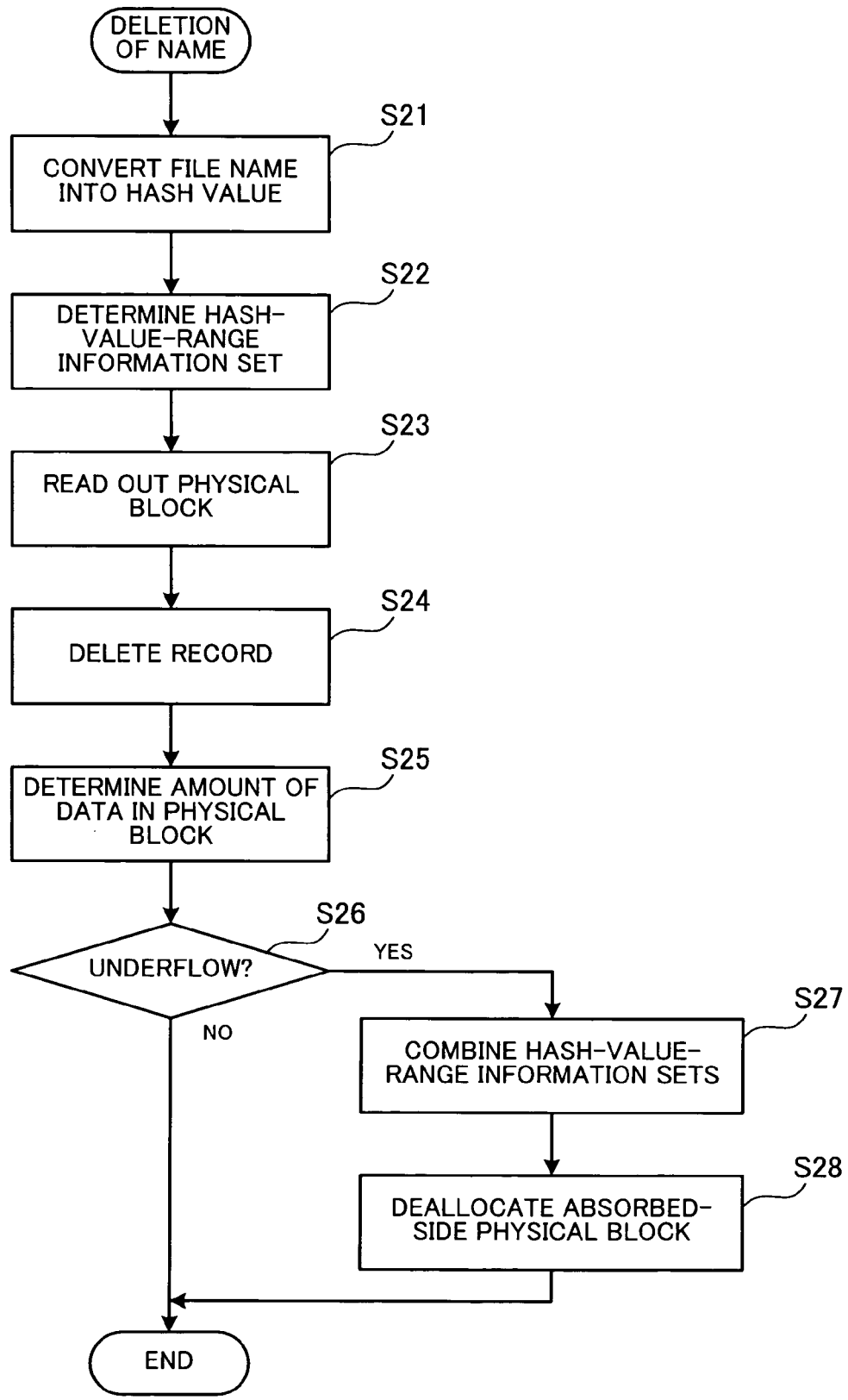
FIG. 13 is a flow diagram indicating a sequence of processing for deleting a name.

FIG. 13 is a flow diagram indicating a sequence of processing for deleting a name. The processing of FIG. 13 is performed when the access management unit 212 outputs to the metadata management unit 110 a request for deletion of a name. The processing illustrated in FIG. 13 is explained below step by step.

[Step S21] The request reception unit 111 passes the above request to the hash-value generation unit 112. Then, the hash-value generation unit 112 converts the file name into a hash value, which is an integer value represented by a finite number of bits. The generated hash value is passed to the physical-block-number acquisition unit 113.

[Step S22] The physical-block-number acquisition unit 113 determines a hash-value-range information set. Specifically, the physical-block-number acquisition unit 113 looks up a dinode corresponding to the directory file to be processed, and acquires the corresponding hash-value-range table. Then, the physical-block-number acquisition unit 113 determines one of hash-value-range information sets registered in the acquired hash-value-range table which includes a hash-value range containing the hash value obtained in step S21. In addition, the physical-block-number acquisition unit 113 passes to the directory processing unit 114 a physical-block number included in the determined hash-value-range information set.

[Step S23] The directory processing unit 114 reads out the physical block from which a record is to be deleted. Specifically, the directory processing unit 114 reads out all data stored in the physical block corresponding to the physical-block number received from the physical-block-number acquisition unit 113.

[Step S24] The directory processing unit 114 makes a linear search of the data read out from the above physical block for a name information item which is designated to be deleted, and deletes a record containing the name information item.

[Step S25] The directory processing unit 114 determines the amount of data (the number of bytes or records) in the physical block. Specifically, the directory processing unit 114 determines whether or not the amount of data in the physical block reaches a predetermined lower limit (or whether or not an underflow occurs) after the record is deleted in step S24.

[Step S26] The operation of the directory processing unit 114 branches according to whether or not an underflow occurs. When an underflow occurs, the operation goes to step S27. When an underflow does not occur, the processing of FIG. 13 is completed.

[Step S27] The directory processing unit 114 combines hash-value-range information sets. That is, the directory processing unit 114 determines a hash-value-range information set with which the hash-value-range information set determined in step S22 is to be combined, i.e., a hash-value-range information set which should absorb the hash-value-range information set determined in step S22. Hereinafter, the hash-value-range information set determined in step S22 is referred to as an absorbed-side hash-value-range information set, and the hash-value-range information set which should absorb the absorbed-side hash-value-range information set is referred to as an absorbing-side hash-value-range information set. Specifically, the directory processing unit 114 chooses as the absorbing-side hash-value-range information set a hash-value-range information set which contains a hash-value range contiguous to the hash-value range in the absorbed-side hash-value-range information set. Then, the directory processing unit 114 generates a new hash-value range which contains both of the hash-value range in the absorbed-side hash-value-range information set and the hash-value range in the absorbing-side hash-value-range information set, and replaces the hash-value range in the absorbing-side hash-value-range information set with the new hash-value range.

[Step S28] The directory processing unit 114 deallocates the physical block corresponding to the physical-block number received from the physical-block-number acquisition unit 113. Specifically, the directory processing unit 114 inserts the records in the physical block which is read out in step S23 and from which the record requested to be deleted is deleted in step S24, into the physical block corresponding to the absorbing-side hash-value-range information set. Then, the directory processing unit 114 deallocates the physical block which is read out in step S23 (and corresponds to the absorbed-side hash-value-range information set), and the processing of FIG. 13 is completed.

In addition, in step S25, it is possible to determine that an underflow occurs when no name information item exists in the physical block. In this case, the operation of inserting the records in step S28 is unnecessary, Therefore, from the viewpoint of reduction in the scale of development, it is advantageous to determine that an underflow occurs when no name information item exists in the physical block.

Further, in step S27, it is possible to choose two hash-value-range information sets with which the hash-value-range information set determined in step S22 is to be combined, and combine the absorbed-side hash-value-range information set and the two hash-value-range information sets into a single hash-value-range information set.

Alternatively, it is possible to choose as the absorbing-side hash-value-range information set one of two hash-value-range information sets contiguous to the absorbed-side hash-value-range information set which has lower efficiency in utilization of the physical block.

Figure 14A:
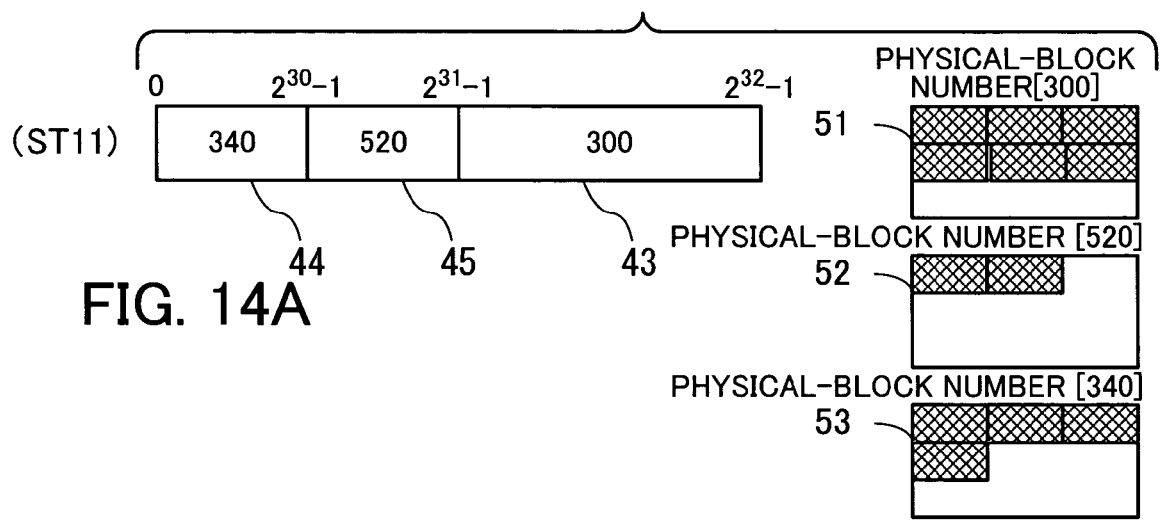
FIGS. 14A and 14B are diagrams illustrating states of the hash-value-range information and storage of records in one or more physical blocks before and after combining of hash-value-range information sets.
Figure 14B:
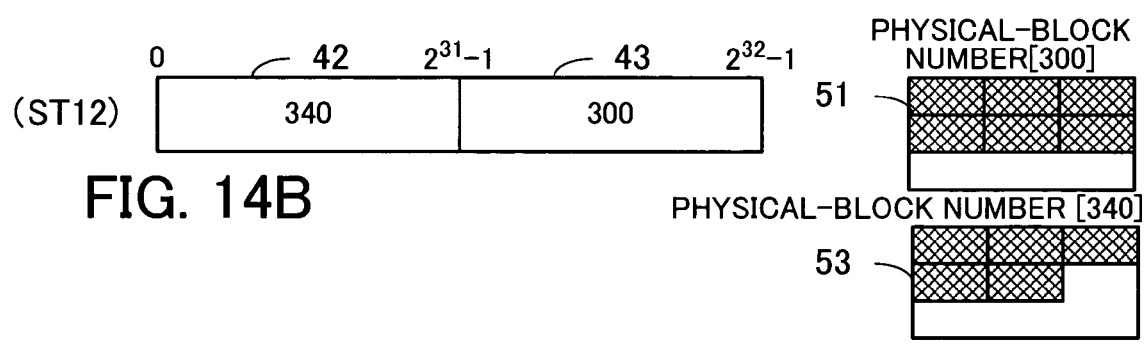

FIGS. 14A and 14B are diagrams illustrating states of the hash-value-range information and storage of records in one or more physical blocks before and after combining of hash-value-range information sets.

The first state (ST11) illustrated in FIG. 14A is a state before combining hash-value-range information sets. In this state, the entire range of hash values is divided into three hash-value ranges 43, 44, and 45. When a record is deleted from the physical block 52 corresponding to the hash-value range 45 and the physical-block number "520," and the number of records in the physical block 52 reaches the lower limit value by the deletion, hash-value-range information sets 44 and 45 are combined.

In the second state (ST12) illustrated in FIG. 14B, the hash-value ranges 44 and 45 are combined into the hash-value range 42. In addition, records which have been stored in the physical block 52 are moved into the physical block 53 corresponding to the hash-value range 44, which is selected as the absorbing-side hash-value-range information set.

Next, a sequence of processing for searching for a name is explained below.

Figure 15:
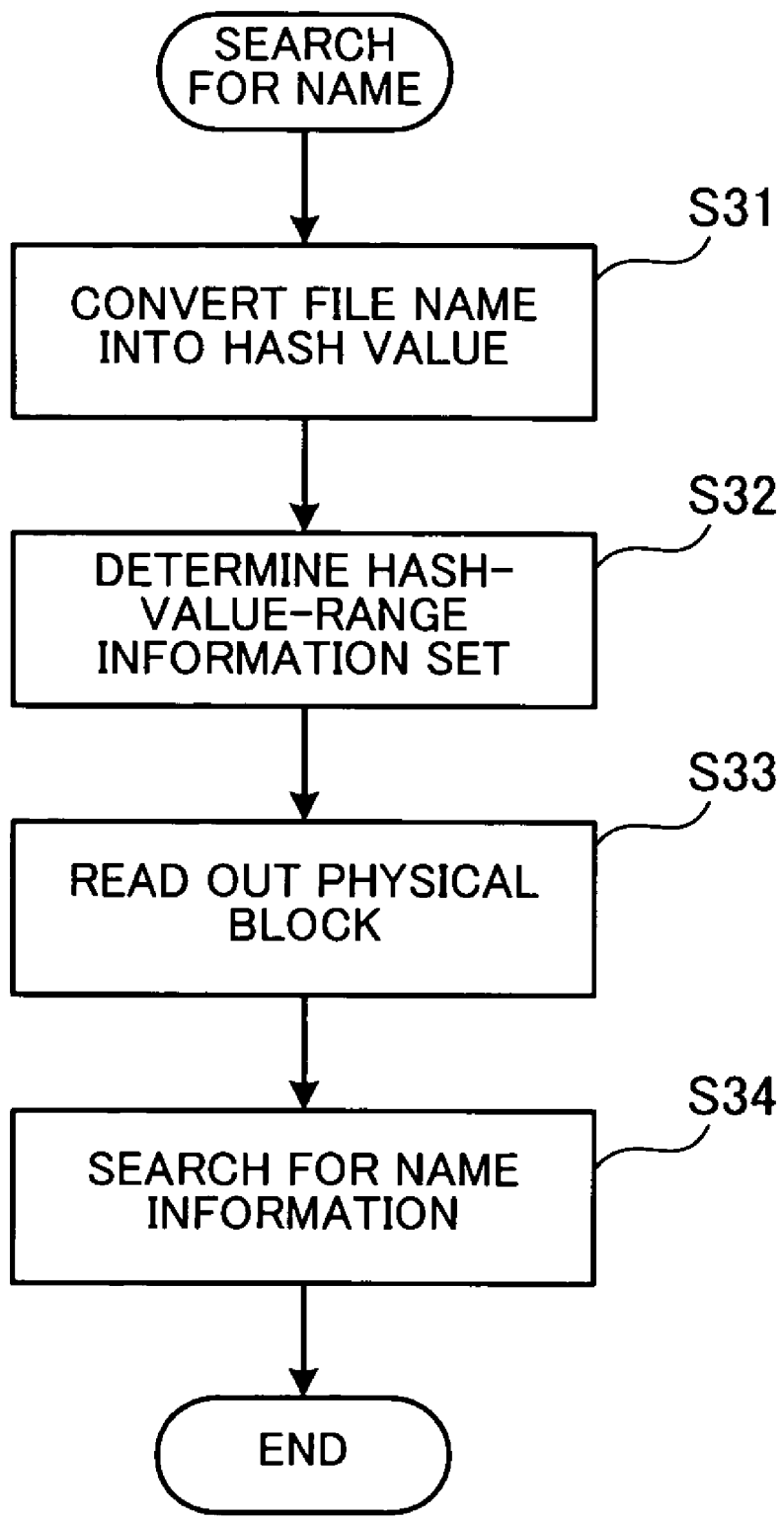
FIG. 15 is a flow diagram indicating a sequence of processing for searching for a name.

FIG. 15 is a flow diagram indicating a sequence of processing for searching for a name. The processing of FIG. 15 is performed when the access management unit 212 outputs to the metadata management unit 110 a request for searching for a name. The processing illustrated in FIG. 15 is explained below step by step.

[Step S31] The request reception unit 111 passes the processing request to the hash-value generation unit 112. Then, the hash-value generation unit 112 converts the file name into a hash value, which is an integer value represented by a finite number of bits. The generated hash value is passed to the physical-block-number acquisition unit 113.

[Step S32] The physical-block-number acquisition unit 113 determines a hash-value-range information set. Specifically, the physical-block-number acquisition unit 113 looks up a dinode corresponding to the directory file to be processed, and acquires the corresponding hash-value-range table. Then, the physical-block-number acquisition unit 113 determines one of hash-value-range information sets registered in the acquired hash-value-range table which includes a hash-value range containing the hash value obtained in step S31. In addition, the physical-block-number acquisition unit 113 passes to the directory processing unit 114 a physical-block number included in the determined hash-value-range information set.

[Step S33] The directory processing unit 114 reads out the physical block to be searched for a name. Specifically, the directory processing unit 114 reads out all data stored in the physical block corresponding to the physical-block number received from the physical-block-number acquisition unit 113.

[Step S34] The directory processing unit 114 makes a linear search of the data read out from the above physical block for a designated name information item, and the result of the search is sent to the access management unit 212.

Next, a sequence of processing for listing of names is explained below. In the following example, the starting position of an operation of listing of names is managed by using cookie information. In this case, the cookie information is information indicating a record from which the operation for listing names is to be started.

For example, in the case where the number of name information items which can be listed by a single sequence of operation for listing names is limited, at the completion of a sequence of operation for listing names, the location of a record from which the succeeding sequence of operation for listing names is to be started is stored as cookie information. Therefore, it is possible to list names following the names listed by the preceding sequence of operation for listing names, by designating the cookie information stored on completion of the preceding sequence of operation for listing names. That is, the location of the record indicated by the stored cookie information is the starting position of the succeeding sequence of operation of listing of names.

For example, the above cookie information can be constituted by the hash value of the name and a relative offset in a physical block (which is hereinafter referred to as an intrablock offset). In this case, a hash-value range can be determined based on the hash value, and a physical block in which a record from which the operation for listing names is to be started is stored can be uniquely determined based on the above hash-value range. In addition, the location of the record from which the operation for listing names is to be started can be determined based on the relative offset in the physical block (intrablock offset).

The cookie information can be represented in any format which enables representation of the hash value of the name and the intrablock offset. For example, the cookie information can be represented by a 64-bit integer value constituted by 32 more significant bits representing the hash value of the name and 32 less significant bits representing the intrablock offset.

When listing of all names in a physical block is not completed in an operation for listing names, e.g., when the operation for listing names is stopped before completion due to a limit imposed by the system, the hash value in the cookie information is unchanged, and only the relative offset in the physical block (intrablock offset) in the cookie information is updated. Therefore, it is possible to prevent double listing of the same name information item.

Figure 16:
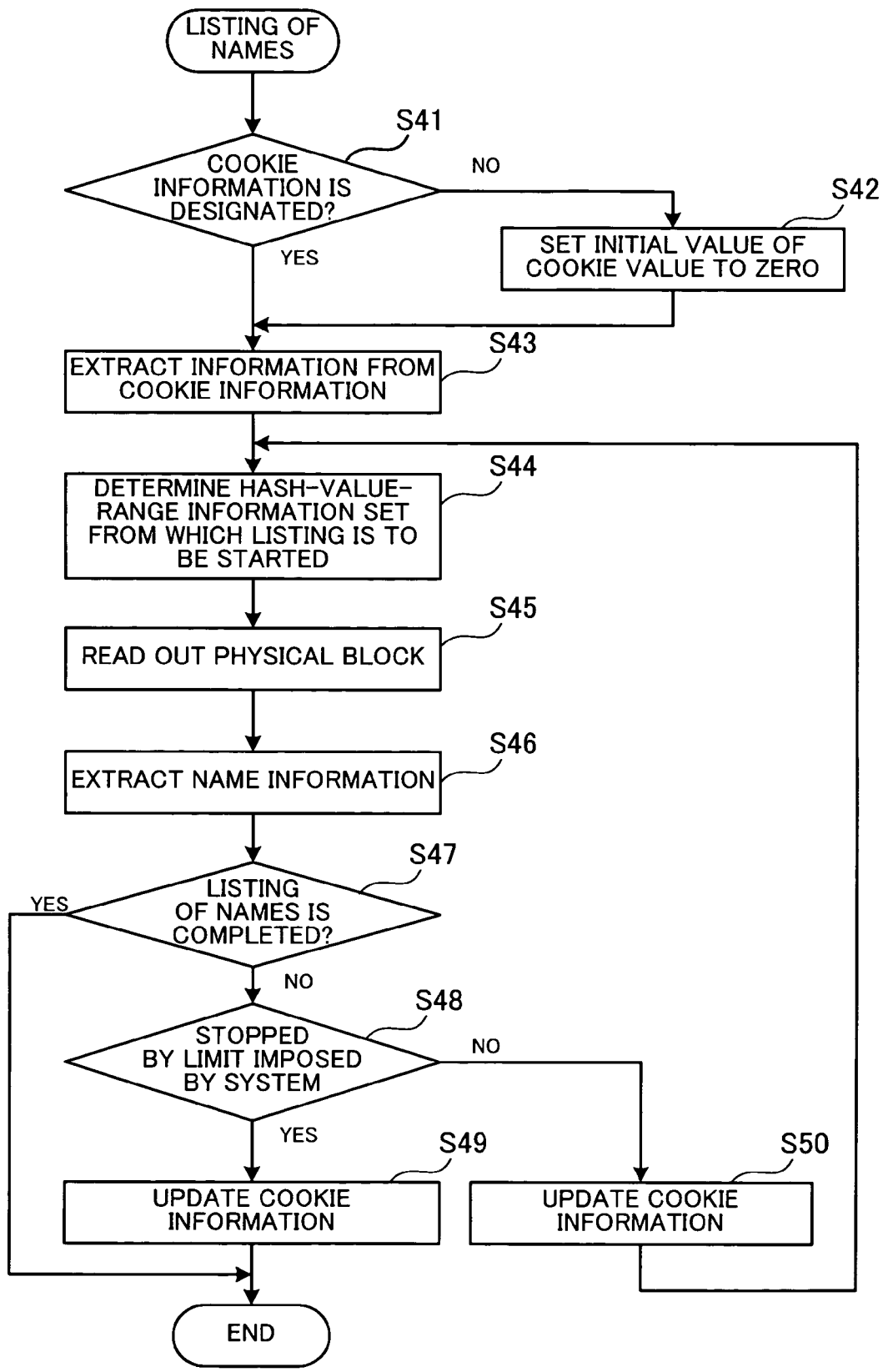
FIG. 16 is a flow diagram indicating a sequence of processing for listing names.

FIG. 16 is a flow diagram indicating a sequence of processing for listing names. The processing of FIG. 16 is performed when the access management unit 212 outputs to the metadata management unit 110 a request for listing names. The processing illustrated in FIG. 16 is explained below step by step.

[Step S41] The physical-block-number acquisition unit 113 determines whether or not the processing request contains designation of cookie information. When yes is determined, the operation goes to step S43. When no is determined, the operation goes to step S42.

[Step S42] The physical-block-number acquisition unit 113 initializes the cookie information. Specifically, the physical-block-number acquisition unit 113 sets each of the hash value and the intrablock offset of the record from which the operation of listing names is to be started, to zero.

[Step S43] The physical-block-number acquisition unit 113 extracts the hash value and the intrablock offset from the cookie information.

[Step S44] The physical-block-number acquisition unit 113 determines a hash-value-range information set corresponding to the record from which the operation of listing names is to be started. Specifically, the physical-block-number acquisition unit 113 determines a hash-value-range information set in which a hash-value range containing the hash value extracted in step S43 is included, among hash-value-range information sets in a corresponding hash-value-range table. In addition, the physical-block-number acquisition unit 113 passes to the directory processing unit 114 a physical-block number included in the determined hash-value-range information set.

[Step S45] The directory processing unit 114 reads out the data stored in the physical block in which the record from which the operation of listing names is to be started is stored. Specifically, the directory processing unit 114 reads out all of the data stored in the physical block corresponding to the physical-block number received from the physical-block-number acquisition unit 113.

[Step S46] The directory processing unit 114 extracts name information from the data stored in the physical block. Specifically, the directory processing unit 114 determines a record in a location indicated by the intrablock offset among the data in the physical block read out in step S45, to be the record from which the operation of listing names is to be started. Then, the directory processing unit 114 extracts records from the data in the physical block in succession from the record from which the operation of listing names is to be started in the forward direction in the arrangement of the data in the physical block. Thereafter, the directory processing unit 114 extracts name information items from the extracted records, and makes a list of the extracted name information items.

When the number of listed name information items reaches an upper limit specified by the system, the operation of listing names is stopped. In addition, when the name information items in all of the records in the data in the physical block read out in step S45 are extracted, the operation of listing names is stopped.

[Step S47] The directory processing unit 114 determines whether or not the operation of listing the names of all of the files under the directory to be processed is completed. Specifically, when the hash-value-range information set determined in step S44 is one, corresponding to the highest hash values, of hash-value-range information sets in the hash-value-range table, and extraction of the name information items of all of the records in the physical block corresponding to the hash-value-range information set is completed, it is possible to determine that the operation of listing the names is completed. When the operation of listing the names is determined to be completed, the processing of FIG. 16 is completed. When the operation of listing the names is determined not to be completed, the operation goes to step S48.

[Step S48] The directory processing unit 114 determines whether or not the operation in step S46 is stopped due to a limit imposed by the system (by increase of the number of listed name information items to the upper limit). When yes is determined, the operation goes to step S49. When no is determined, the operation goes to step S50.

[Step S49] Since the operation in step S46 is stopped due to a limit imposed by the system, the directory processing unit 114 updates the relative offset in a physical block (intrablock offset) in the cookie information. Specifically, the directory processing unit 114 updates the intrablock offset in the cookie information with a value indicating a record following the final record from which the name information item is lastly extracted in step S46, and thereafter the processing of FIG. 16 is completed.

[Step S50] Since the operation in step S46 is stopped due to a cause other than a limit imposed by the system, the directory processing unit 114 updates the hash value in the cookie information. Specifically, the directory processing unit 114 updates the hash value in the cookie information with the starting value of the hash-value range in the hash-value-range information set following the hash-value-range information set determined in step S44 in the hash-value-range table, and the operation goes to step S44.

As explained above, according to the embodiment of the present invention, it is possible to remarkably improve the performance of the processing for searching a directory by only making a small modification of an extent-based file system, i.e., replacement of only one or more extent tables for one or more directory files with one or more hash-value-range tables. The extent-based file systems have been becoming mainstream, and every extent-based file system has extent tables (i.e., tables indicating correspondence between logical-block ranges and physical-block ranges). According to the present invention, only one or more extent tables for one or more directory files in a conventional extent-based file system is replaced with one or more hash-value-range tables (i.e., tables indicating correspondence between hash-value ranges of names and physical-block ranges). Thus, it is possible to increase the efficiency in access to the directory files without making extensive modification to an existing extent-based file system.

The above processing functions can be realized by computers. In this case, programs for the file management apparatus, the metadata server 100, and the access-client hosts 210, 220, and 230 are provided. The programs describe details of the processing functions which the file management apparatus, the metadata server 100, and the access-client hosts 210, 220, and 230 should have. The processing functions of each of the file management apparatus, the metadata server 100, and the access-client hosts 210, 220, and 230 is realized on a computer when the computer executes the corresponding one of the above programs.

The above programs describing the details of processing can be stored in one or more computer-readable recording mediums. The computer-readable recording mediums may be a magnetic recording device, an optical disk, an optical magnetic recording medium, a semiconductor memory, or the like. The magnetic recording device may be a hard disk drive (HDD), a flexible disk (FD), a magnetic tape, or the like. The optical disk may be a DVD (Digital Versatile Disk), a DVD-RAM (Random Access Memory), a CD-ROM (Compact Disk Read Only Memory), a CD-R (Recordable)/RW (Re-Writable), or the like. The optical magnetic recording medium may be an MO (Magneto-Optical Disk) or the like.

In order to put the programs into the market, for example, it is possible to sell a portable recording medium such as a DVD or a CD-ROM in which the programs are recorded. Alternatively, the above programs can be stored in a storage device belonging to a server computer, and transferred from the server computer to the above computers through a network.

The computer which executes each of the above programs stores the program in a storage device belonging to the computer, where the program is originally recorded in, for example, a portable recording medium, or transferred from the server computer. Then, the computer reads the program from the storage device, and performs processing in accordance with the program. Alternatively, the computer may directly read the program from the portable recording medium for performing processing in accordance with the program. Further, the computer can sequentially execute processing in accordance with each portion of the program when the portion of the program is transferred from the server computer.

As explained above, according to the present invention, a hash value is obtained from name information, and a physical-block number is acquired by looking up a hash-value-range table. Therefore, only the physical block indicated by the physical-block number is the object to be processed in relation to a record containing the name information, and data in a directory file can be efficiently accessed.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable medium storing a file management program which makes a computer perform processing for management of files in a storage device, the program comprising:

a request reception unit which receives a processing request and determines whether a file to be processed is a directory file or a non-directory file;

a hash-value generation unit which, if the file to be processed in response to said processing request is the directory file, applies a predetermined hash function to name information contained in said processing request, and generates a hash value of the name information;

a physical-block-number acquisition unit which, if the file to be processed in response to said processing request is the non-directory file, acquires a logical-block number of data to be accessed with reference to a dinode, and looks up an extent table indicating correspondence between logical-block numbers and physical-block numbers to acquire a physical-block number of the data to be accessed, and if the file to be processed in response to said processing request is the directory file, looks up, in place of the extent table, a hash-value-range table containing at least one hash-value-range information set each of which is constituted by a hash-value range defining a range of hash values and a physical-block number uniquely indicating a data storage region in said storage device, extracts one of the at least one hash-value-range information set in which a hash-value range containing the hash value of the name information is included, and acquires a physical-block number from the one of the at least one hash-value-range information set; and a directory processing unit which, if the file to be processed in response to said processing request is the directory file, performs processing of a physical block in said storage device corresponding to said physical-block number acquired by said physical-block-number acquisition unit, where the processing relates to a record containing said name information and is performed in accordance with said processing request, wherein when said processing request instructs insertion of said name information, said directory processing unit inserts said record containing said name information into data acquired from said physical block, and puts the data into which the record is inserted, back into said physical block, wherein said directory processing unit determines whether or not said record can be inserted into said data, and inserts the record into said data when the record can be inserted into the data; and when the record cannot be inserted into the data, said directory processing unit divides said hash-value range containing the hash value of the file to be processed, into a plurality of hash-value ranges, updating said hash-value-range table by registering in the hash-value-range table a plurality of hash-value-range information sets corresponding to the plurality of hash-value ranges, and performs processing for insertion of said record by looking up the updated hash-value-range table.

2. The computer readable medium according to claim 1, wherein when an amount of data in said physical block exceeds a predetermined upper limit by insertion of said record, said directory processing unit determines that said record cannot be inserted into said data.

3. A computer-readable medium storing a file management program which makes a computer perform processing for management of files in a storage device, the program comprising:

a request reception unit which receives a processing request and determines whether a file to be processed is a directory file or a non-directory file;

a hash-value generation unit, if the file to be processed in response to said processing request is the directory file, applies a predetermined hash function to the name information, and generates a hash value of the file to be processed;

a physical-block-number acquisition unit which, if the file to be processed in response to said processing request is the non-directory file, acquires a logical-block number of data to be accessed with reference to a dinode, and looks up an extent table indicating correspondence between logical-block numbers and physical-block numbers to acquire a physical-block number of the data to be accessed, and if the file to be processed in response to said processing request is the directory file, looks up, in place of the extent table, a hash-value-range table containing at least one hash-value-range information set each of which is constituted by a hash-value range defining a range of hash values and a physical-block number uniquely indicating a data storage region in said storage device, extracts one of the at least one hash-value-range information set in which a hash-value range containing the hash value of the name information is included, and acquires a physical-block number from the one of the at least one hash-value-range information set; and a directory processing unit which, if the file to be processed in response to said processing request is the directory file, performs processing of a physical block in said storage device corresponding to said physical-block number acquired by said physical-block-number acquisition unit, where the processing relates to a record containing said name information and is performed in accordance with said processing request, wherein when said processing request instructs deletion of said name information, said directory processing unit deletes said record containing said name information from data acquired from said physical block, and puts the data from which the record is deleted, back into said physical block;

wherein after said record is deleted from said data, said directory processing unit determines whether or not combining of the at least one hash-value-range information set is necessary, and combines said one of the at least one hash-value-range information set with another of the at least one hash-value-range information set when the combining of said at least one hash-value-range information set is determined to be necessary; and wherein when an amount of data remaining in said physical block reaches a predetermined lower limit by deletion of said record, said directory processing unit determines that combining of said at least one hash-value-range information set is necessary.

4. The computer readable medium according to claim 3, wherein when combining of said at least one hash-value-range information set is determined to be necessary, and two hash-value-range information sets corresponding to two hash-value ranges contiguous to said hash-value range containing the hash value of the file to be processed exist, said directory processing unit combines said one of the at least one hash-value-range information set with one of the two hash-value-range information sets which corresponds to a physical block containing a smaller amount of data.

5. A file management process for managing files in a storage device by using a computer, comprising the steps of:
 (a) receiving a processing request and determining whether a file to be processed is a directory file or a non-directory file, by a request reception unit;
 (b) if the file to be processed in response to said processing request is the directory file, applying a predetermined hash function to name information contained in said processing request, and generating a hash value of the name information, by a hash-value generation unit;
 (c) if the file to be processed in response to said processing request is the non-directory file, acquiring a logical-block number of data to be accessed with reference to a dinode, and looking up an extent table indicating correspondence between logical-block numbers and physical-block numbers to acquire a physical-block number of the data to be accessed, and if the file to be processed in response to said processing request is the directory file, looking up, in place of the extent table, a hash-value-range table containing at least one hash-value-range information set each of which is constituted by a hash-value range defining a range of hash values and a physical-block number uniquely indicating a data storage region in said storage device, extracting one of the at least one hash-value-range information set in which a hash-value range containing the hash value of the file to be processed is included, and acquiring a physical-block number from the one of the at least one hash-value-range information set, by a physical-block-number acquisition unit; and
 (d) if the file to be processed in response to said processing request is the directory file, performing, by a directory processing unit, processing of a physical block in said storage device corresponding to said physical-block number acquired by said physical-block-number acquisition unit, where the processing relates to a record containing said name information and is performed in accordance with said processing request,
 wherein said directory processing unit determines whether or not said record can be inserted into said data, and inserts the record into said data when the record can be inserted into the data; and
 when the record cannot be inserted into the data, said directory processing unit divides said hash-value range containing the hash value of the file to be processed, into a plurality of hash-value ranges, updating said hash-value-range table by registering in the hash-value-range table a plurality of hash-value-range information sets corresponding to the plurality of hash-value ranges, and performs processing for insertion of said record by looking up the updated hash-value-range table.

6. A file management apparatus for managing files in a storage device, comprising:
 a request reception unit stored in a metadata server which receives a processing request and determines whether a file to be processed is a directory file or a non-directory file;
 a hash-value generation unit which, if the file to be processed in response to said processing request is the directory file, applies a predetermined hash function to the name information, and generates a hash value of the file to be processed;
 a physical-block-number acquisition unit which, if the file to be processed in response to said processing request is the non-directory file, acquires a logical-block number of data to be accessed with reference to a dinode, and looks up an extent table indicating correspondence between logical-block numbers and physical-block numbers to acquire a physical-block number of the data to be accessed, and if the file to be processed in response to said processing request is the directory file, looks up, in place of the extent table, a hash-value-range table containing at least one hash-value-range information set each of which is constituted by a hash-value range defining a range of hash values and a physical-block number uniquely indicating a data storage region in said storage device, extracts one of the at least one hash-value-range information set in which a hash-value range containing the hash value of the name information is included, and acquires a physical-block number from the one of the at least one hash-value-range information set; and
 a directory processing unit which, if the file to be processed in response to said processing request is the directory file, performs processing of a physical block in said storage device corresponding to said physical-block number acquired by said physical-block-number acquisition unit, where the processing relates to a record containing said name information and is performed in accordance with said processing request,
 wherein said directory processing unit determines whether or not said record can be inserted into said data, and inserts the record into said data when the record can be inserted into the data; and
 when the record cannot be inserted into the data, said directory processing unit divides said hash-value range containing the hash value of the file to be processed, into a plurality of hash-value ranges, updating said hash-value-range table by registering in the hash-value-range table a plurality of hash-value-range information sets corresponding to the plurality of hash-value ranges, and performs processing for insertion of said record by looking up the updated hash-value-range table.

7. A file management process for management of files in a storage device, the process comprising:
 receiving a processing request and determining whether a file to be processed is a directory file or a non-directory file;
 generating a hash value of name information contained in said processing request by applying a predetermined hash function to the name information if the file to be processed in response to said processing request is the directory file;
 acquiring a physical-block-number by acquiring a logical-block number of data to be accessed with reference to a dinode and looking up an extent table indicating correspondence between logical-block numbers and physical-block numbers to acquire a physical-block number of the data to be accessed if the file to be processed in response to said processing request is a non-directory file, and if the file to be processed in response to said processing request is the directory file, looking up a hash-value-range table containing at least one hash-value-range information set, each of which is constituted by a hash-value range defining a range of hash values and a physical-block number uniquely indicating a data storage region in said data storage device, extracting one of the at least one hash-value-range information sets in which a hash-value range containing the hash value of the name information is included, and acquiring a physical-block number from the one of the at least one hash-value-range information sets; and processing a physical block in said storage device corresponding to said physical-block number acquired by physical-block-number acquisition unit if the file to be processed in response to said processing request is the directory file, where the processing relates to a record containing said name information and is performed in accordance with said processing request, wherein when said processing request instructs deletion of said name information, said record containing said name information is deleted from data acquired from said physical block, and the data from which the record was deleted is put back into said physical block, wherein after said record is deleted from said data, it is determined whether or not combining of the at least one set hash-value-range information sets is necessary, and said one the at least one hash-value-range-information sets is combined with another of the at least one hash-value-range information sets when the combining of said at least one hash-value-range information sets is deemed to be necessary, and wherein when an amount of data remaining in said physical block reaches a predetermined lower limit by deletion of said record, it is determined that combining said at least one hash-value-range information sets is necessary.

8. A file management apparatus for management of files in a storage device, comprising:

a request reception unit stored in a metadata server which receives a processing request and determines whether a file to be processed is a directory file or a non-directory file;

a hash-value generation unit that generates a hash value of name information contained in said processing request if the file to be processed in response to said processing request is the directory file by applying a predetermined hash function to the name information;

a physical-block-number acquisition unit that, if the file to be processed in response to said processing request is the non-directory file, acquires a logical-block number of data to be accessed with reference to a dinode, and looks up an extent table indicating correspondence between logical-block numbers and physical-block numbers to acquire a physical-block number of the data to be accessed, and if the file to be processed is the directory file, acquires a physical-block-number by looking up a hash-value-range table containing at least one hash-value-range information set, each of which is constituted by a hash-value range defining a range of hash values and a physical-block number uniquely indicating a data storage region in said data storage device, extracting one of the at least one hash-value-range information sets in which a hash-value range containing the hash value of the name information is included, and acquiring a physical-block number from the one of the at least one hash-value-range information sets; and a directory processing unit that, if the file to be processed in response to said processing request is the directory file, processes a physical block in said storage device corresponding to said physical-block number acquired by physical-block-number acquisition unit, where the processing relates to a record containing aid name information and is performed in accordance with said processing request, wherein when said processing request instructs deletion of said name information, said directory processing unit deletes said record containing said name information from data acquired from said physical block, and puts the data from which the record was deleted back into said physical block, wherein after said record is deleted from said data, said directory processing unit determines whether or not combining the at least one hash-value-range information sets is necessary, and combines said one of the at least one hash-value-range-information sets with another of the at least one hash-value-range information sets when the combining of said at least one hash-value-range information sets is determined to be necessary, and wherein when an amount of data remaining in said physical block reaches a predetermined lower limit by deletion of said record, said directory processing unit determines that combining said at least one hash-value-range information sets is necessary.

* * * * *